(12) United States Patent
Pitwon

(10) Patent No.: US 9,690,067 B2
(45) Date of Patent: Jun. 27, 2017

(54) OPTICAL COUPLING SYSTEMS, APPARATUS, AND METHODS

(71) Applicant: Xyratex Technology Limited, Havant (GB)

(72) Inventor: Richard C. A. Pitwon, Fareham (GB)

(73) Assignee: Xyratex Technology Limited, Havant (GB)

( * ) Notice: Subject to any disclaimer, the term of this patent is extended or adjusted under 35 U.S.C. 154(b) by 0 days.

(21) Appl. No.: 14/823,118

(22) Filed: Aug. 11, 2015

(65) Prior Publication Data

US 2017/0045703 A1    Feb. 16, 2017

(51) Int. Cl.
*G02B 6/44* (2006.01)
*G02B 6/26* (2006.01)
*G02B 6/25* (2006.01)

(52) U.S. Cl.
CPC .............. *G02B 6/4457* (2013.01); *G02B 6/25* (2013.01); *G02B 6/262* (2013.01); *G02B 6/264* (2013.01)

(58) Field of Classification Search
CPC ........ G02B 6/4457; G02B 6/262; G02B 6/25; G02B 6/264
See application file for complete search history.

(56) References Cited

U.S. PATENT DOCUMENTS

| | | | |
|---|---|---|---|
| 6,014,713 A | 1/2000 | Agnew et al. | |
| 6,511,009 B1 | 1/2003 | Harrison et al. | |
| 6,640,041 B2 | 10/2003 | Ichinari et al. | |
| 6,915,058 B2 | 7/2005 | Pons | |
| 7,120,349 B2 | 10/2006 | Elliott | |
| 7,315,681 B2 | 1/2008 | Kewitsch | |
| 8,248,776 B2 | 8/2012 | Haigh | |
| 8,270,152 B2 | 9/2012 | Haigh | |
| 2007/0036506 A1* | 2/2007 | Kewitsch | G02B 6/4457 385/135 |
| 2012/0025005 A1* | 2/2012 | Smith | B65H 75/146 242/603 |
| 2013/0284844 A1* | 10/2013 | Holmberg | B65H 75/38 242/407 |

* cited by examiner

*Primary Examiner* — Ryan Lepisto
(74) *Attorney, Agent, or Firm* — Mueting, Raasch & Gebhardt, P.A.

(57) ABSTRACT

Optical couplings systems, apparatus, and methods may include an optical cable coupling device, or spool, and one or more optical coupling features. The one or more optical coupling features may be configured to optically couple an optical cable and another optical cable, each of which are storable on the optical cable coupling device. The optical cable coupling device and optical cables may be used on a modular device (e.g., computing device, networking device, storage device, etc.). The optical cable coupling device may define a radius that less than about 200% the minimum bend radius of the optical cables.

15 Claims, 18 Drawing Sheets

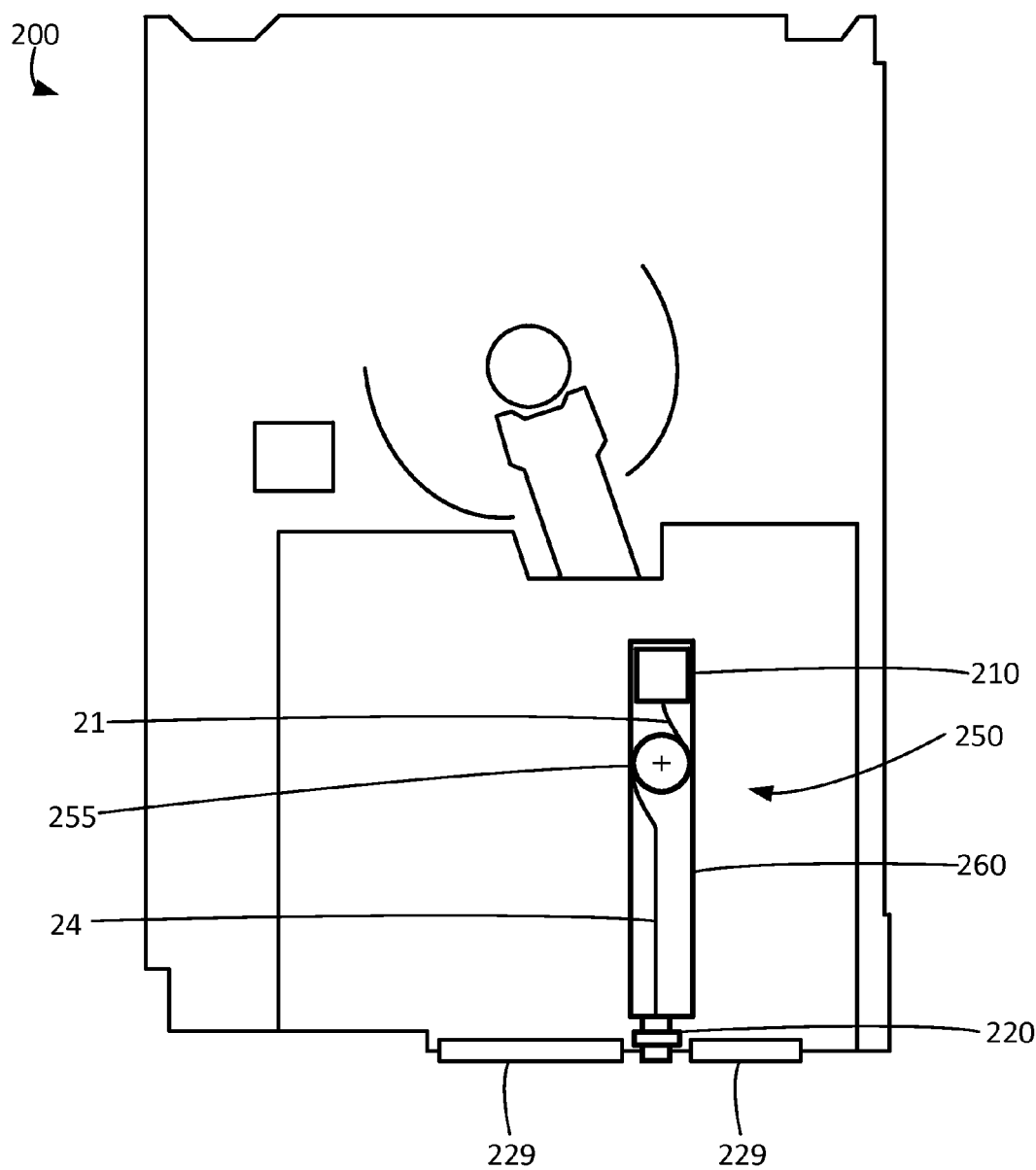

OPTICAL COUPLING SYSTEMS, APPARATUS, AND METHODS

The disclosure herein relates to optical coupling systems, apparatus, and methods including optical cable coupling devices (e.g., spools, reels, etc.) for holding optical cables for use in, e.g., electronic devices (e.g., storage devices, microservers, switches, etc.).

SUMMARY

Exemplary apparatus may include a single spool rotatable about an axis. The single spool may define a circumferential surface to store at least a portion of each of a first optical cable and a second optical cable about the axis. The exemplary apparatus may further include one or more optical coupling features coupled to the spool and optically coupling the first optical cable to the second optical cable.

An exemplary system may include a first optical cable extending from a first end portion to a second end portion, a second optical cable extending from a first end portion to a second end portion, and an optical cable coupling device rotatable about an axis and defining a circumferential surface to store at least a portion of each of the first and second optical cables about the axis. The exemplary system may further include biasing apparatus to bias the optical cable coupling device for rotation about the axis in a clockwise direction to wind at least a portion of each of the first and second optical cables on the circumferential surface and at least one optical coupling feature coupled to the optical cable coupling device and optically coupling the second end portion of the first optical cable to the second end portion of the second optical cable.

An exemplary method may include providing a removable device. The removable device may include a single spool rotatable about an axis and defining a circumferential surface to store at least a portion of each of a first cable (e.g. optical cable) and a second cable (e.g. optical cable) about the axis, wherein the first cable is operably coupled to removable device, at least one coupling feature (e.g. optical coupling feature) coupled to the spool and coupling (e.g., optically coupling) the first cable to the second cable, and a connector (e.g., optical connector) to couple (e.g., optically couple) to the second cable. The exemplary method may further include unwinding at least a portion of each of the first and second cables from the spool in response to moving the connector away from removable device and rewinding at least a portion of each of the first and second cables about the spool in response to moving the connector towards the removable device.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

FIGS. 11A-11D are bottom views of an exemplary storage device and optical coupling system.

DETAILED DESCRIPTION

Figure 1:
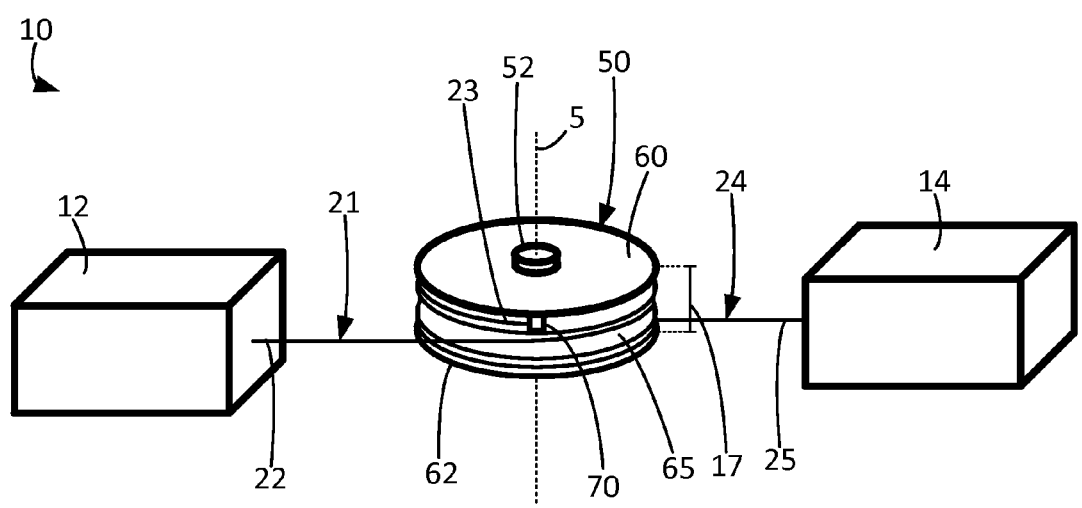
FIG. 1 is a perspective view of an exemplary optical coupling system including an optical cable coupling device.

The disclosure herein includes exemplary optical couplings systems, apparatus, structures, and methods.

Electronic devices such as, e.g., storage devices, computing devices, networking devices, etc. may include optical interfaces for the transmission of data over one or more optical cables. The optical cables may carry one or more light transmitting elements such as, e.g., optical fibres, optical waveguides, and/or any other material or structure configured to transmit light. The optical cables may be cumbersome (e.g., may become tangled, etc.) when being used to optically coupling electronic devices to each other. Further, the optical cables may be fragile, and thus, proper storage of the optical cables may be important.

Additionally, the light transmitting elements may define a minimum bend radius that is the minimum radius that the light transmitting elements should be bended (e.g., curved, directed, looped, etc.). Thus, storage apparatus configured to store the optical cables (including the light transmitting elements) should not bend the optical cables such that the optical cables violate the minimum bend radius (e.g., such that the optical cables do not define, or have, a bend radius less that the minimum bend radius.

Additionally, the optical cables may include optical connectors that are integrated with, or in conjunction with, other connectors of the electronic devices such as electrical connectors. For example, the optical connectors may be coupled to, or integrated with, removable devices or modules configured to be used with a device enclosure. The device enclosure may be configured to receive a plurality of removable devices including a plurality of different removable devices and different connectors or interfaces (e.g., to electrically and/or optically couple the removable devices to the device enclosure and/or to each other). The removable devices may be data storage devices, networking devices, and/or computing devices. When the removable devices are data storage devices, the removable devices may be referred to as a disk-drive-in-carriers. In other words, the disclosure herein may be described as providing a low-cost, optical coupling systems, apparatus, and methods for use within one or more removable devices such as, e.g., disk-drive-in-carriers, micro-server-in-carriers, switch-in-carriers, hybrid-microserver-drive-in-carriers, etc. The exemplary optical connectors that may be used with the optical coupling systems, apparatus, and methods may include parallel multi-fibre/multi-waveguide ferrule portions (e.g., MT ferrules, MXC ferrules, etc.) that are arranged to fit within standard electrical high performance disk drive interfaces (e.g., SFF 8639). The exemplary optical connectors may be small enough, or sized such that, the optical connectors fit within existing non-optical connectors or interfaces.

The present disclosure could be used as part of an extendable, detachable optical interface for drive modules. The present disclosure may be described as providing retractable optical cables in very space limited environments such as removable devices such as, e.g., drive modules, computing modules, networking modules, etc. where retraction of an optical cable must occur in both directions.

The bend radius of light transmitting elements (e.g., optical fibres, optical waveguides, etc.) may be as little as 2 millimeters (mm). Thus, minimum reel radius of a retractable optical spool (e.g., in which the light transmitting element integrity is not violated with repeated use) would be at minimum 2 mm.

The present disclosure may be described as including optical coupling features that use in-plane mirrors to halve the minimum size of an optical cable coupling device such as a spool or reel. The exemplary optical coupling features may be used with detachable, extendable optical interfaces on drive modules for use in, e.g., high density storage enclosures. The exemplary apparatus, systems, and methods may be further described as enabling smaller, retractable optical cable coupling devices (e.g., spools, reels, etc.). One or more embodiments may be described as small retractable reel systems based on integrated mirrors for optic cables (e.g., fibre optic cables, waveguides, etc.) allowing movable cable management within spatially-confined areas such as removable devices such as, e.g., disk drive modules. Further, as will be further described, the exemplary embodiments may include mirrored and an optical channel (e.g., an optical fibre, an optical waveguide, etc.) to bypass the minimum bend radius limitations, which may allow the minimum reel size to be decreased.

Exemplary systems, apparatus, structures, and methods shall be described with reference to FIGS. 1-12. It will be apparent to one skilled in the art that elements or processes from one embodiment may be used in combination with elements or processes of the other embodiments, and that the possible embodiments of such apparatus, structures, systems, and methods using combinations of features set forth herein is not limited to the specific embodiments shown in the figures and/or described herein. Further, it will be recognized that timing of the processes and the size and shape of various elements herein may be modified but still fall within the scope of the present disclosure, although certain timings, one or more shapes and/or sizes, or types of elements, may be advantageous over others.

Figure 4:
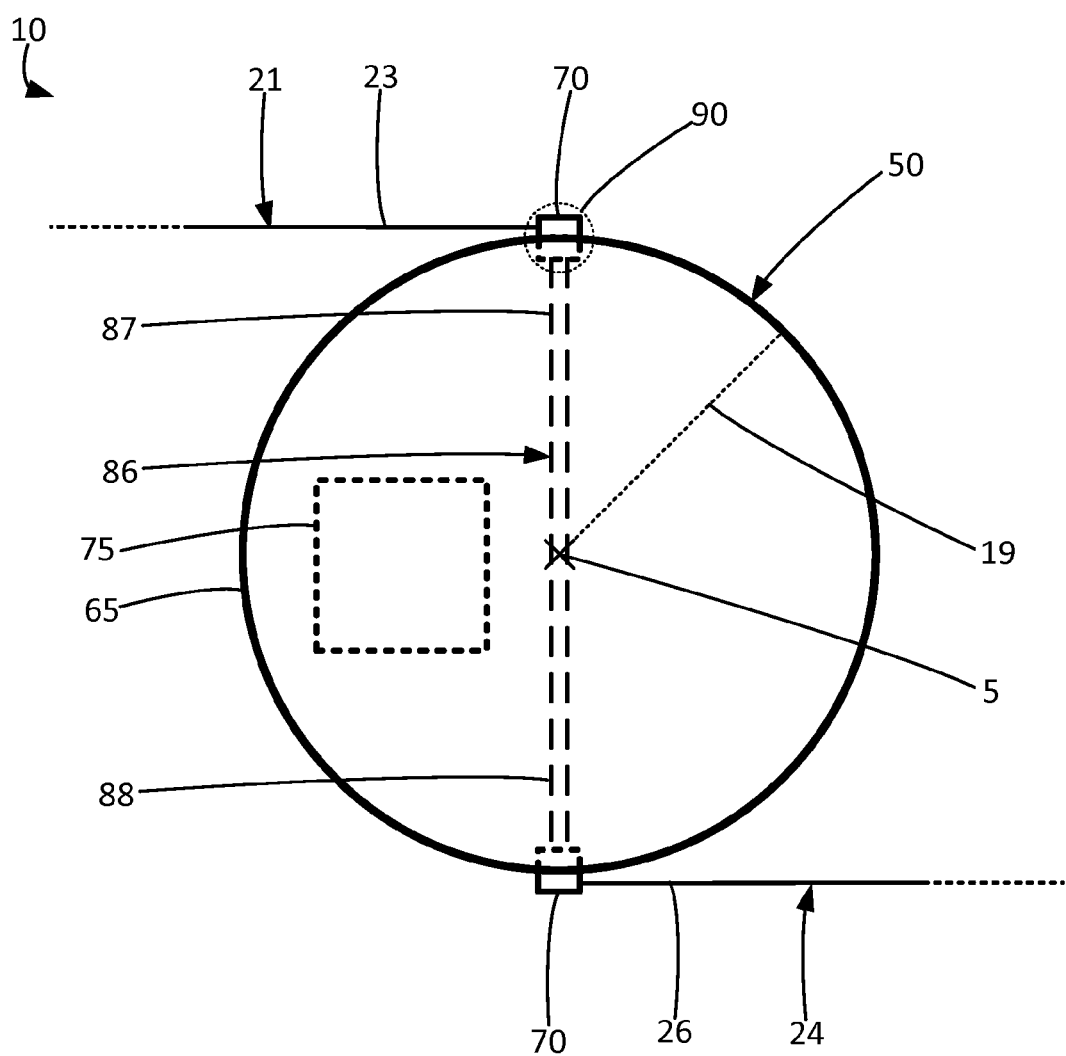
FIG. 4 is an enlarged, bottom view of the optical cable coupling device of the system of FIG. 1 with the optical cables completely unwound.

An exemplary optical coupling system 10 optically coupling a first device 12 to a second device 14 is depicted in FIG. 1. More specifically, a first optical cable 21 extends from a first end portion 22 to a second end portion 23, and a second optical cable 24 extends from a first end portion 25 to a second end portion 26 (the second end portion 26 is hidden in FIG. 1 but is shown in FIG. 4). The first end portion 22 of the first optical cable 21 is optically and physically coupled to the first device 12 to, e.g., facilitate optical data connections to and from the first device 12. The first end portion 25 of the second optical cable 24 is optically and physically coupled to the second device 14 to, e.g., facilitate optical data connections to and from the second device 14.

Each of the first and second optical cables 21, 24 may be configured to transmit light thereon. For example, each of the first and second cables 21, 24 may include one or more light transmitting elements such as, e.g., optical fibres, flexible optical waveguides (e.g., polymer optical waveguides on a flexible substrate, etc.) and a sheathing, or cladding, surrounding the one or more optical fibres. Each of the one or more optical light transmitting elements may define, or have, a minimum bend radius associated therewith that will be described further herein.

The exemplary system 10 further includes an optical cable coupling device 50 configured to hold, or receive, at least a portion of each of the first and second optical cables 21, 24. The optical cable coupling device 50, at least in this embodiment, may be described as a "spool" or "reel," and in this disclosure, will be described as a "spool" further herein.

The second end portion 23 of the first optical cable 22 may be physically and optically coupled to at least a portion or element that is coupled to or is part of the spool 50, and a second end portion 26 of the second optical cable 24 may be physically operably coupled to at least a portion or element that is coupled to or is part of the spool 50 also. The spool 50 may include (e.g., be formed of) one or more materials such as, for example, metals, polymers, semiconductors, resin, glass, and/or carbon fibre. In one or more embodiments, the spool 50 may be described as being a rigid structure.

As described, thee spool 50 may be configured to hold, or receive, at least a portion of each of the first and second optical cables 21, 24. To do so, the spool 50 may be rotatable about an axis 5 to spool, or wind, each of the first optical cable 21 and the second optical cable 24 about a circumferential surface 65 of the spool 50. In other words, spool 50 may include a circumferential surface 65 extending around the circumference of the spool 50 that is configured to receive (e.g., wrapped thereabout) each of the first and second optical cables 21, 24. Further, it is to be understood the each of the first and second optical cables 21, 24 are received by and wrapped about the same circumferential surface 65 of the spool 50. In other words, the spool 50 may be a single portion defining a single circumferential surface 65. Thus, when the spool 50 rotates about the axis 5, each of the first and second optical cables 21, 24 are either wound or unwound from the same circumferential surface 65. Therefore, the exemplary system 10 may be described as including a "single" spool 50 for each of the first and second optical cables 21, 24.

Further, the spool 50 may define a first side surface 62 and a second side surface 60 that is opposite the first side surface 62. Each of the first and second side surfaces 62, 60 may extend in planes that are perpendicular, orthogonal, to the axis 5 and the circumferential surface 65. Further the spool 50 may include a spindle portion 52 extending from each of the first and second side surfaces 60, 62 along the axis 5. In one or more embodiments, the spindle portion 52 may be configured to be coupled to another structure to hold, or restrain, the spindle 50 with respect to the another structure while the spool 50 rotates.

Figure 2:
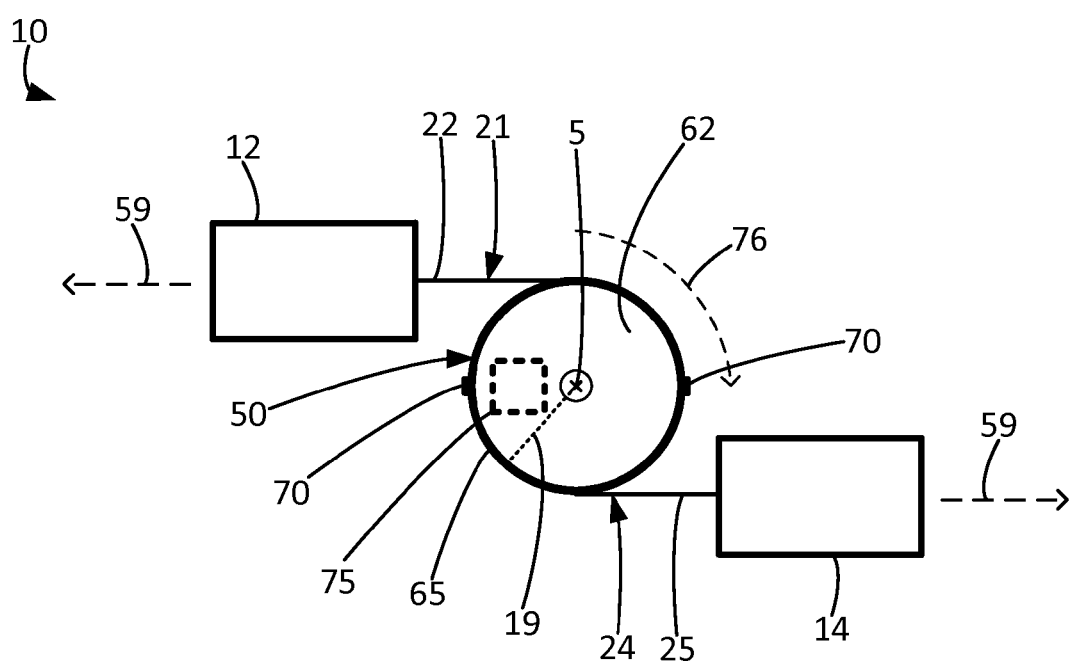
FIG. 2 is a bottom view of the system of FIG. 1.
Figure 3:
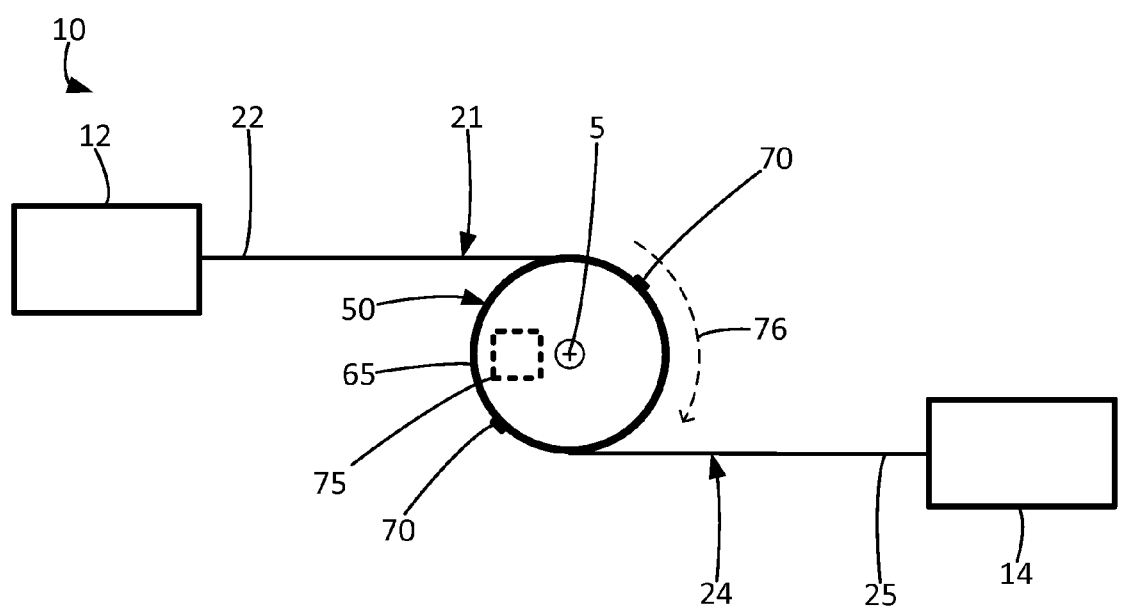
FIG. 3 is another bottom view of the system of FIG. 1 with the optical cables further unwound than as shown in FIG. 2.

As shown in the bottom views of FIGS. 2-3, the spool 50 may further include biasing apparatus 75 configured to rotate the spool 50 in the clockwise direction 76 about the axis 5 to wind, or spool, the first and second optical cables 21, 24 about the spool 50 on the circumferential surface 65. In other embodiments, the biasing apparatus 75 may be configured by spool 50 in the counterclockwise direction about axis 5. The biasing apparatus 75 may include one or more resilient portions including, e.g., metal springs, polymer springs, and/or elastic (e.g., resilient) polymer material.

The biasing apparatus 75 may provide a force to rotate spool 50 in the clockwise direction 76 about axis 5 absent at least some forces 59 acting on either the first and/or second devices 12, 14 and/or the first and second optical cables 21, 24. In other words, the biasing apparatus 75 may "pull" on each of the first and second optical cables 21, 24 opposite the direction of the forces 59 to wrap the first and second optical cables 21, 24 about circumferential surface 65 of the spool 50. In this way, the biasing apparatus 75 and the spool 50 may maintain the first and second optical cables 21, 24 extending from the first and second devices 12, 14, respectively, in an orderly fashion when the first and second devices 12, 14 may be moved apart from one another. It may be described that the spool 50 is configured to retract the first and second optical cables 21, 24 after the optical cables are pulled away from the spool 50.

For example, the first device 12 may be attached to removable device such as, e.g., a storage device, a networking device, a computing device, etc., and the second device 14 may be an optical connector configured to be attached to a another device such as a drive dongle, network interface card (NIC), etc. A second device 14, which in this example may be an optical connector, may be extended from the first device 12 to be coupled to the corresponding optical connector of the receiving device. When the second device 14 is extended from the first device 12, the first and second optical cables 21, 24 may unwind, or unspool, from the spool 50 as the spool rotates in the counterclockwise direction (e.g., against the biased rotation direction 76). Once the optical connectors of the second device and of the other device have been coupled, the removable device may be re-positioned, and the biasing apparatus 75 in the spool 50 may rewind, or wrap, the first and second optical cables 21, 24 about the circumferential surface 65 of the spool 50 in the clockwise direction 76 as shown in FIGS. 2-3. Additional exemplary optical coupling systems used with various devices will be further described herein with respect to FIGS. 11-12.

As described herein, the light transmitting elements (e.g., optical fibres, optical waveguides, etc.) of the first and second cables 21, 24 may define, or have, a minimum bend radius. In other words, the minimum bend radius may be property or characteristics of the light transmitting elements of the first and second cables 21, 24. The minimum bend radius may be the bend radius at which the light transmitting elements of the first and second cables 21, 24 may become damaged when being bent or curved.

For example, the light transmitting elements of the first and second optical cables 21, 24 may have a minimum bend radius that is greater than or equal to about 0.5 millimeters (mm), greater than or equal to about 1 mm, greater than or equal to about 1.25 mm, greater than or equal to about 1.5 mm, greater than or equal to about 1.75 mm, greater than or equal to about 2.0 mm, greater than or equal to about 2.25 mm, greater than or equal to about 2.5 mm, etc. and/or less than or equal to about 7 mm, less than or equal to about 6 mm, less than or equal to about 5 mm, less than or equal to about 4.5 mm, less than or equal to about 4 mm, less than or equal to about 3.5 mm, less than or equal to about 3 mm, less than or equal to about 2.75 mm, less than or equal to about 2.4 mm, less than or equal to about 2.1 mm, less than or equal to about 1.8 mm, less than or equal to about 1.4 mm, etc. In at least one embodiment, the light transmitting elements of the first and second optical cables 21, 24 may have a minimum bend radius that is about 2 mm.

The spool 50 may define, or have, a radius 19 as labeled in FIG. 4. In one or more embodiments, the radius 19 of the spool 50 may be equal to about the minimum bend radius of the light transmitting elements of the first and second optical cables 20, 24. In other words, in one or more embodiments, the radius 19 may be equal to about 100% of the minimum bend radius of the light transmitting elements of the first and second optical cables 20, 24. For example, if the light transmitting elements of the first and second optical cables 21, 24 define, or have, a minimum bend radius about 2 mm, the radius 19 of the spool 50 may be about 2 mm.

In other embodiments, the radius 19 of the spool 50 may be greater than the minimum bend radius of the light transmitting elements of the first and second optical cables 21, 24. For example the radius 19 may be greater than or equal to about 110% of the minimum bend radius of the light transmitting elements, greater than or equal to about 120% of the minimum bend radius of the light transmitting elements, greater than or equal to about 130% of the minimum bend radius of the light transmitting elements, greater than or equal to about 140% of the minimum bend radius of the light transmitting elements, greater than or equal to about 150% of the minimum bend radius of the light transmitting elements, greater than or equal to about 160% of the minimum bend radius of the light transmitting elements, greater than or equal to about 170% of the minimum bend radius of the light transmitting elements, greater than or equal to about 180% of the minimum bend radius of the light transmitting elements, greater than or equal to about 190% of the minimum bend radius of the light transmitting elements, greater than or equal to about 200% of the minimum bend radius of the light transmitting elements, etc. and/or less than or equal to about 210% of the minimum bend radius of the light transmitting elements, less than or equal to about 205% of the minimum bend radius of the light transmitting elements, less than or equal to about 195% of the minimum bend radius of the light transmitting elements, less than or equal to about 185% of the minimum bend radius of the light transmitting elements, less than or equal to about 175% of the minimum bend radius of the light transmitting elements, less than or equal to about 165% of the minimum bend radius of the light transmitting elements, less than or equal to about 155% of the minimum bend radius of the light transmitting elements, less than or equal to about 145% of the minimum bend radius of the light transmitting elements, less than or equal to about 135% of the minimum bend radius of the light transmitting elements, less than or equal to about 125% of the minimum bend radius of the light transmitting elements, less than or equal to about 115% of the minimum bend radius of the light transmitting elements, less than or equal to about 105% of the minimum bend radius of the light transmitting elements, etc.

The spool 50 may further define a height 17 as labeled in FIG. 1 that extends between the first and second side surfaces 62, 60. The height 17 of the spool 50 may be between about 1 mm and about 6 mm. For example, the height 17 of the spool 50 may be greater than or equal to about 1.0 mm, greater than or equal to about 1.5 mm, greater than or equal to about 2.0 mm, greater than or equal to about 2.5 mm, greater than or equal to about 3.5 mm, greater than or equal to about 4.0 mm, greater than or equal to about 4.5 mm, greater than or equal to about 5.25 mm, greater than or equal to about 5.75 mm, etc. and/or less than or equal to about 6.0 mm, less than or equal to about 5.5 mm, less than or equal to about 5.0 mm, less than or equal to about 4.25 mm, less than or equal to about 3.75 mm, less than or equal to about 3.25 mm, less than or equal to about 2.75 mm, less than or equal to about 2.25 mm, less than or equal to about 1.75 mm, less than or equal to about 1.25 mm, etc. It is to be understood that the spool height 17 may exclude the height, or thickness, of the portions, or sides, of the spool 50 defining the side surfaces 60, 62. In other words, the spool height 17 may be defined by the circumferential surface 65 between the sides of the spool 50, which is used for the winding of the optical cables 21, 24.

In one or more embodiments, the height 17 may be based on, or determined by, the size of optical cables 21, 24 passing along the spool 50. Further, the size of the optical cables 21, 24 may be based on, or determined by, the number of light transmitting elements (e.g., optical fibres, optical waveguides, etc.) carried by each of the optical cables 21, 24. For example, each optical cable 21, 24 may carry between 1 and about 64 light transmitting elements. The height 17 may be slightly larger than the diameter of the optical cables 21, 24 (which, as noted herein, is determined by the amount, or number, of light transmitting elements carried thereby).

In at least one embodiment, the optical cables 21, 24 each include 64 light transmitting elements (e.g., in a 4×16 optical fibre ribbon configuration) defining a cable diameter of about 4 mm to about 6 mm. Thus, in this embodiment, the height 17 of the spool 50 for carrying, or holding, the optical cables 21, 24 may be about 4 mm to about 6 mm.

As shown in FIG. 2, each of the first and second optical cables 21, 24 are partially unreeled, or unspooled, from the spool 50, and in FIG. 3, each of the first and second optical cables 21, 24 are further unreeled, or unspooled, from the spool 50. As such, the spool 50 will have been rotated in the counterclockwise direction to allow the first and second devices 12, 14 to move apart from one another from as shown in FIG. 2 to as shown in FIG. 3.

Each of the first and second optical cables 21, 24 are shown to be completely unreeled, or unspooled, in the enlarged view of a portion of the system 10 as shown in FIG. 4. For example, each of the first and second optical cables 21, 24 are not adjacent and extending from the circumferential surface 65 of the spool 50. Instead, each of the first and second up cables 21, 24 are extending from additional portions, or structures, coupled to the spool 50. In one or more embodiments, these additional portions, or structures, coupled to the spool 50 may be referred to as optical junctions 70. The optical junctions 70 may be configured to physically couple the first and second optical cables 21, 24 to the spool portion 50. In other words, each of the first and second optical cables 21, 24 may be physically coupled to the optical junctions 70, and the optical junctions 70 may be physically coupled to the spool 50. The optical junction 70 may include (e.g., be formed of) one or more materials such as, for example, metals, polymers, semiconductors, and/or glass. In one or more other embodiments, the first and second optical cables 21, 24 may be physically coupled to the spool 50 without the use of the junctions 70. For example, the first and second optical cables 21, 24 may be "directly" physically coupled to the spool 50 (e.g., the spool 50 may define one or more grooves or V-grooves, one or more apertures, etc. to receive the first and second cables 21, 24).

In other words, one or more embodiments may include an optical junction, or discrete optical component, to couple the light transmitting elements (e.g., optical fibres, optical waveguides, etc.) to the optical channel and/or the light transmitting elements to each other. The optical junction may include one or more of a V-groove or similar fibre/waveguide self-aligner for the light transmitting element (e.g., optical fibre) and a mirrored deflection component, e.g., microelectromechanical systems (MEMS).

To optically couple the first optical cable 21 to the second optical cable 24, exemplary optical coupling systems and apparatus may further include one or more optical coupling features 80 that are coupled to the spool 50 and/or coupling to other portions that are coupled to the spool 50. The optical coupling features 80 may be defined as any light directing elements, apparatus, devices, and/or material configured to optically couple two optical cables to each other. For example, the optical coupling features 80 may include any light guiding elements such as, for example, any optical element described as being capable of reflecting, directing, guiding, deflecting, refracting, diverting, etc. light from one light transmitting element (e.g., optical fibre, optical waveguide, etc.) to another light transmitting element.

Although the first and second optical cables 21, 24 are optically coupled by the one or more optical coupling features 80, it is to be understood that first and second optical cables 21, 24 are not different regions or segments of the same optical cable with another middle region or segment being labeled, or referred to, as an optical coupling feature. Instead, the first and second optical cables 21, 24 are discrete, separate elements, as well as the one or more optical coupling features 80. In other words, any spool that includes a single, continuous optical cable that is extended through or around a portion of such spool does not include optical coupling features or two optical cables as described herein.

The optical coupling features 80 may be described as discrete elements or independent components from the first and second optical cables 21, 24 (e.g., the optical coupling features 80 are not merely a "middle" segment of a single optical cable coupling a "left" segment of the same single optical cable to "right" segment of the same single optical cable). The optical coupling features 80 will be described further herein with respect to FIGS. 4-6.

Figure 5:
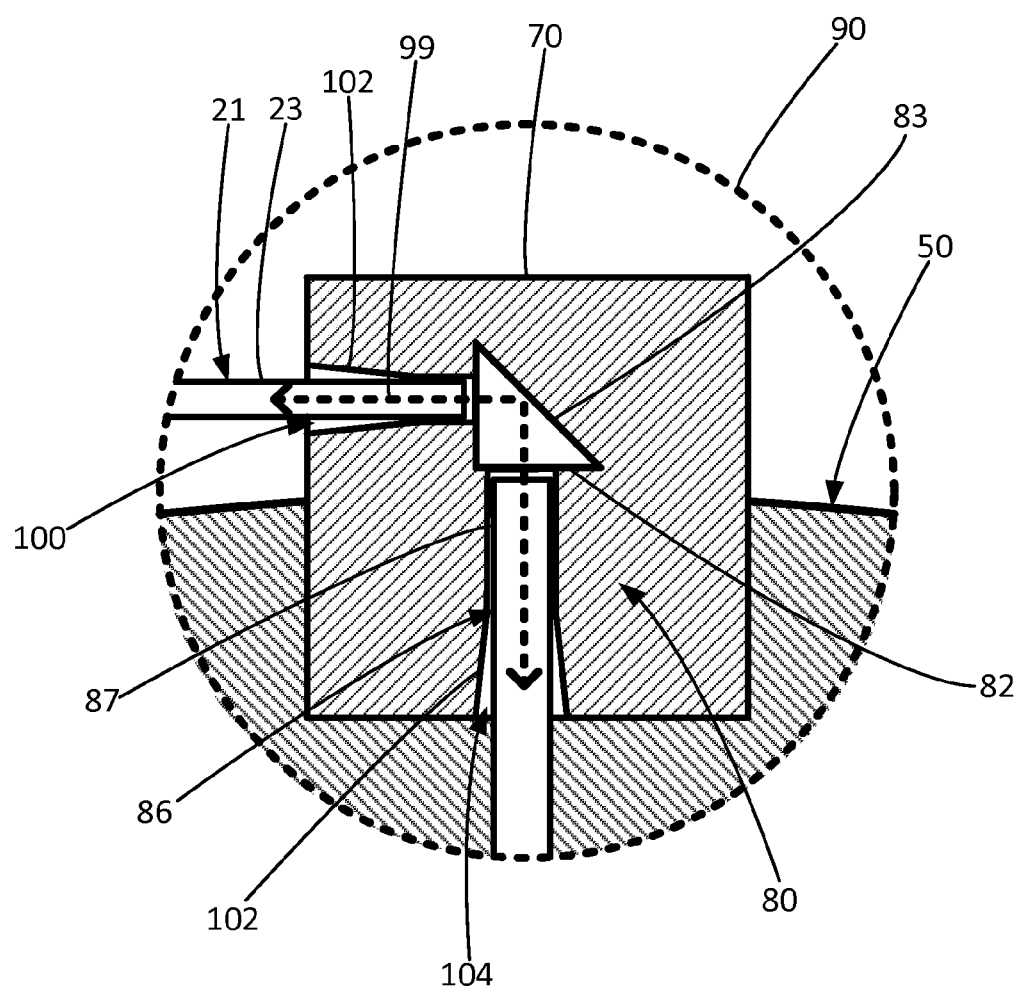
FIG. 5 is an enlarged, cross-sectional view of a portion of the system of FIG. 4.
Figure 6:
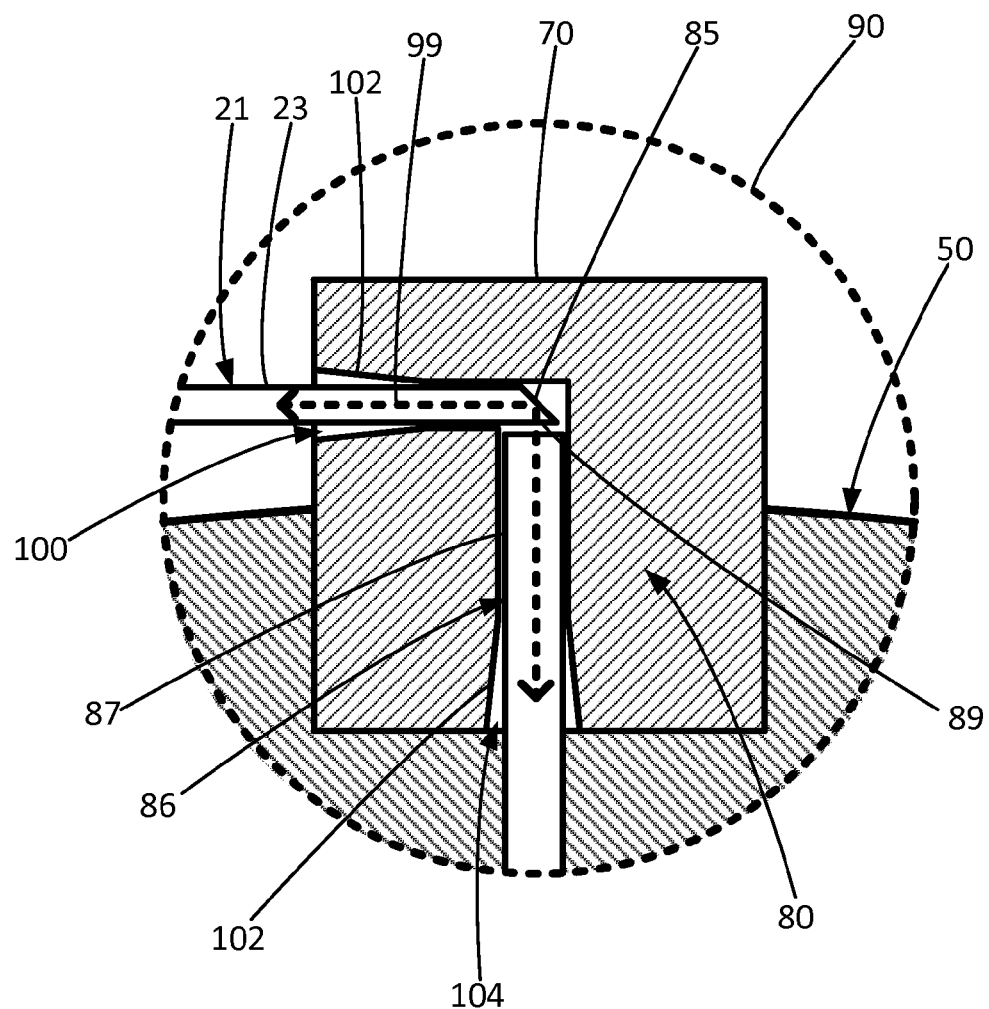
FIG. 6 is another enlarged, cross-sectional view of a portion of the system of FIG. 4.

Two exemplary optical coupling features 80 used in the exemplary embodiment as shown in FIGS. 1-4 are shown in FIGS. 5-6. More specifically, a cross-section of the area 90 of FIG. 4 taken perpendicular, orthogonal, to the axis 5 is shown in each of FIGS. 5-6 to show one or more optical coupling features 80 inside the optical junctions 70 and/or inside the spool 50.

In FIG. 5, the optical coupling features 80 may include optical deflectors 82 and an optical channel 86. The optical channel 86 may extend from a first end portion 87 to a second end portion 88 as shown by dashed lines in FIG. 4 (e.g., the optical channel may be located within the spool 50). The optical channel 86 may include one or more of optical fibres, optical waveguides, free space, voids, etc. The optical channel 86 may include one or more materials such as, e.g., glasses, polymers, silica, resin, vacuum, and/or air. In at least one embodiment, the optical channel 86 may include micro-structured materials such as photonic bandgap fibres or waveguides. In at least one embodiment, the optical channel 86 may include two or more different materials arranged with respect to each other in a defined geometry to cause or enhance light guiding effects. Further, such materials may include various glasses, polymers, silica, resin, vacuum, and/or air.

As shown, the optical deflector 82 is located in the optical junction 70 so as to receive and transmit light from the second end portion 23 of the first optical cable 21 and to receive and transmit light from a first end portion 87 of the optical channel 86. Further, although not shown in FIG. 5, the optical junction 70 is located opposite (e.g., opposite sides of the spool 50, 180 degrees about the spool 50, etc.) from another optical junction 70 as shown in FIG. 4, which may also include an optical deflector similar to, or the same as, the optical deflector 82. The other optical deflector may be configured to receive and transmit light from the second end portion 26 of the second optical cable 24 and to receive and transmit light from the second end portion 88 of the optical channel 86.

The optical deflector 82 may be configured to reflect, or redirect, light from and to the second end portion 23 of the first optical cable 21 about 90 degrees to and from the first end portion 87 of the optical channel 86 as shown by the double-sided arrow 99. In other words the optical deflector 82 may define angle redirection of 90 degrees to redirect light 90 degrees to and from each of the second portion 23 of the first optical cable 21 and the first portion 87 of the optical channel 86.

The optical deflector 82 may include one or more materials configured to at least transmit light. The one or more materials of the optical deflector 82 may include, e.g., glasses, polymers, metals, silica, air, vacuum, and/or resin.

The deflector 82 may further include, or define, a reflective surface 83 is positioned at a 45 degree angle to an axis extending along the second end portion 23 of the first optical cable 21 and a 45 degree angle to an axis extending along the optical channel 86 (e.g., at least in axis extending along the first end portion 87 of the optical channel 86). The reflective surface 83 may be metallized surface (including e.g., silver, gold, aluminum, nickel, and/or chromium). Further, the reflective surface 83 may also use total internal reflection (TIR) to deflect light by 90 degrees, whereby a wedge of transparent material 82 such as polymer, glass or silica forms an index boundary 83 with a lower index material (e.g., air or vacuum).

In other embodiments, the deflector 82 may include any type of like turning structure or material to turn, or bend, the light from and to the second portion 23 of the first optical cable 21 and the first portion 87 of the optical channel 86.

Although the exemplary optical coupling features 80 as shown in FIG. 5 are configured to turn light (e.g., reflect, refract, deflect, redirect, bend, etc. light) about 90 degrees, is the understood that other exemplary optical coupling features not depicted may be configured to turn light at different angles to accomplish similar optical coupling between the first and second optical cables 21, 24. For example, the first and second optical cables 21, 24 may not be physically coupled to the spool 50 opposite from one another (e.g., 180 degrees from one another about the circumferential surface 65 of the spool 50), and may be configured in any configuration or location so as to facilitate the optical coupling of the first and second optical cables 20, 24. In other words, the optical coupling features 80 may be configured to couple the first and second optical cables 21, 24 using any angles of reflection or redirection to accomplish the optical coupling of the first and second optical cables 21, 24.

In FIG. 6, the optical coupling features 80 include, or define, a cleaved surface 85 of the second portion 23 of the first optical cable 21 and an optical channel 86 similar to that as described with respect to FIG. 5. In at least one embodiment, the first optical cable 21 may be totally internally reflective (TIR) such that, e.g., light transmitted over the first optical cable 21 may be reflected from the cleaved surface 85 of the second end portion 23 of the first optical cable 21 into the first end portion 87 of the optical channel 86 and light transmitted over the optical channel 86 through the first end portion 87 may be received and reflected by the cleaved surface 85 of the second end portion 23 of the first optical cable 21 into the first optical cable 21 towards the first end portion 22 as shown by the double-sided arrow 99. In at least one embodiment, the second end portion 23 of the first optical cable 21 may include a polished region 89 to, e.g., allow the light to enter/exit the first optical cable 21. Further in at least one embodiment, the cleaved surface 85 may also include or define a reflective surface such as a metallized surface to direct light to and from the second portion 23 of the first optical cable 21 and the first portion 87 of the optical channel 86. Similar to the previous embodiment, the optical junction 70 that is opposite optical junction 70 in FIG. 4 may include similar optical coupling elements 80 as shown in FIG. 6.

The optical junctions 70 as shown in each of FIGS. 5-6 may define a first aperture 100 configured to receive at least a portion of the second portion 23 of the first optical cable 21 and to physically couple the second portion 23 of the first optical cable 21 to the optical junction 70. Further, the optical junctions 70 may also define a second aperture 104 configured to receive at least a portion of the first portion 87 of the optical channel 86 and to physically couple the first portion 87 of the optical channel 86 to the optical junction 70. Additionally, the first and second apertures 100, 104 may be configured to align each of the first optical cable 21 and the optical channel 86 to select, or provide, the optical coupling therebetween and potentially in conjunction with any other optical coupling element 80.

The first optical cable 21 and the optical channel 86 may be physically coupled to the optical junction 70 in many different ways. For example the first optical cable 21 and optical channel 86 may be adhered inside of each of the first and second apertures 100, 104 using an adhesive. Further, for example, the first and second apertures 100, 104 may be sized such that the first optical cable 21 and the optical channel 86 may fit within the apertures 100, 104 with an interference fit to provide physical coupling therebetween.

Further, as shown, each of the first and second apertures 100, 104 may define tapered regions 102 configured to, e.g., provide ease of alignment of each of the first optical cable 21 and the optical channel 86 to be inserted therein, provide a limited amount of movement for each of the first optical cable 21 and optical channel 86, etc.

Still further, although not depicted, it is to be understood that the first and second optical cables 21, 24 and the one or more optical coupling features 80 such as the optical deflectors 82 and the optical channel 86 may be optically coupled through the use of low-loss or no-loss optical coupling elements, features, apparatus, and/or methods such as, e.g., using optical coupling liquids, refractive matching fluids, refractive index matching gels, and/or refractive index matching adhesives.

In other words, the exemplary embodiments depict in FIGS. 1-5 may be described as a 90 degree mirrored retractable nested reel, or spool, including one or more optical coupling features. The optical coupling features may include mirrored features and an optical channel (e.g., optical fibre, optical waveguide, etc.) to bypass the minimum bend radius limitations of the light transmitting elements of the optical cables. Further, each mirrored interface may define a 45 degree reflective surface to deflect light output from one light transmitting element into the optical channel oriented at 90 degrees from the light transmitting element. The light transmitting element and the optical channel may be fixed in position and precisely aligned relative to each other. Further, the optical channel between both 90 degree fixed mirror structures or devices may be describe as an optical bridge that extends between two points on the circumference of the reel (e.g., extending along the diameter of the reel).

Further, the optical cables may be fully spooled around the spool or reel, and in this arrangement, the optical cables may be spooled over themselves a number of times along the circumferential surface, or rim, of the reel. The radius of the spool may be equal to about the minimum radius of curvature of the light transmitting elements in use in the optical cables. Further, as shown, an optical channel, or an optical bridge, passes along the diameter of the reel between the optical deflectors. The optical channel, or bridge, may be a length of optical fibre or a fixed waveguide integrated into the reel itself.

Figure 7:
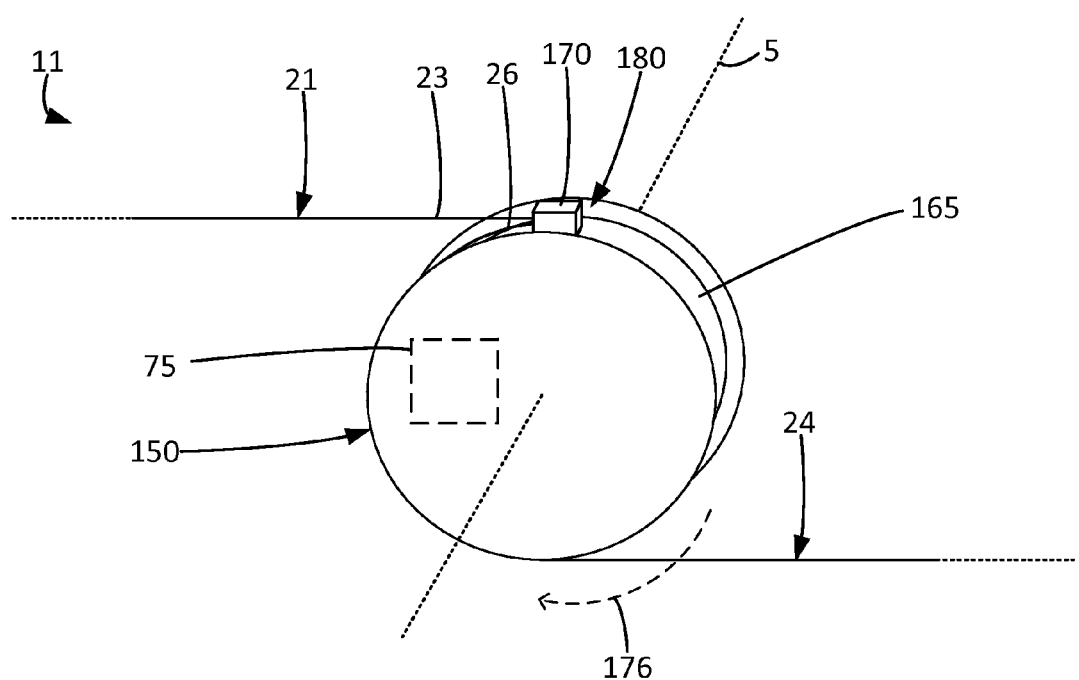
FIG. 7 is a perspective view of an exemplary optical connector system including an optical cable coupling device.

Another exemplary optical coupling system 11 including a first optical cable 21, a second optical cable 24, and an optical cable coupling device, or spool, 150 configured to hold, or receive, the first and second optical cables 21, 24 is depicted in FIGS. 7-10. The exemplary optical coupling system 11 further includes one or more coupling features 180 to optically couple the first optical cable 21 to the second optical cable 24. Similar to the spool 50 described herein with respect to FIGS. 1-6, the optical cable coupling device, or spool, 150 may be rotatable about an axis 5, may define a radius 19 extending from the axis 5, and may include biasing apparatus 75 configured to bias the rotation of the spool 150 in the clockwise direction 176 as shown in FIG. 7.

The exemplary system 11 may further include a single optical junction 170 that is physically coupled to each of the first and second optical cables 21, 24, and the one or more optical coupling features 180 to optically couple the first optical cable 21 to the second optical cable 24 may be located within the optical junction 170. The one or more optical coupling features 180 of this embodiment may be configured to turn light approximately, or about, 180 degrees from the first optical cable 21 to the second optical cable 24 and from the second optical cable 24 to the first optical cable 21. Similar to the embodiments described herein with respect to FIGS. 1-6, the one or more optical coupling features 180 may include any one of more optical coupling elements, portions, or devices configured to receive and direct light between the first optical cable 21 and the second optical cable 24.

Figure 8:
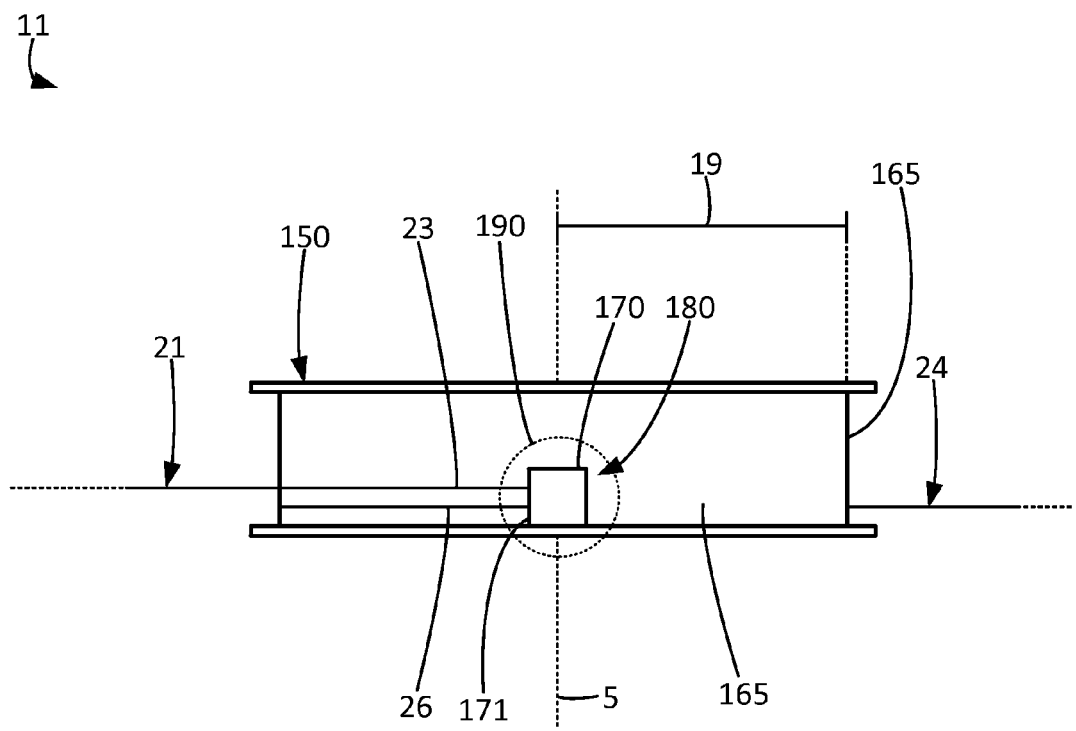
FIG. 8 is a side view of the system of FIG. 7.

Although this embodiment may only include a single optical junction 170, it is to be understood in other embodiments more than one optical junction 170 may be used. As shown in FIG. 8, each of the second end portions 23, 26 of the first and second optical cables 21, 24 are coupled to the same side surface, or portion, 171 of the optical junction 170. Thus, the light of each of the first and second optical cables 21, 24 must be turned (e.g., bent, reflected, directed, redirected, etc.) about 180 degrees between each other.

Figure 9:
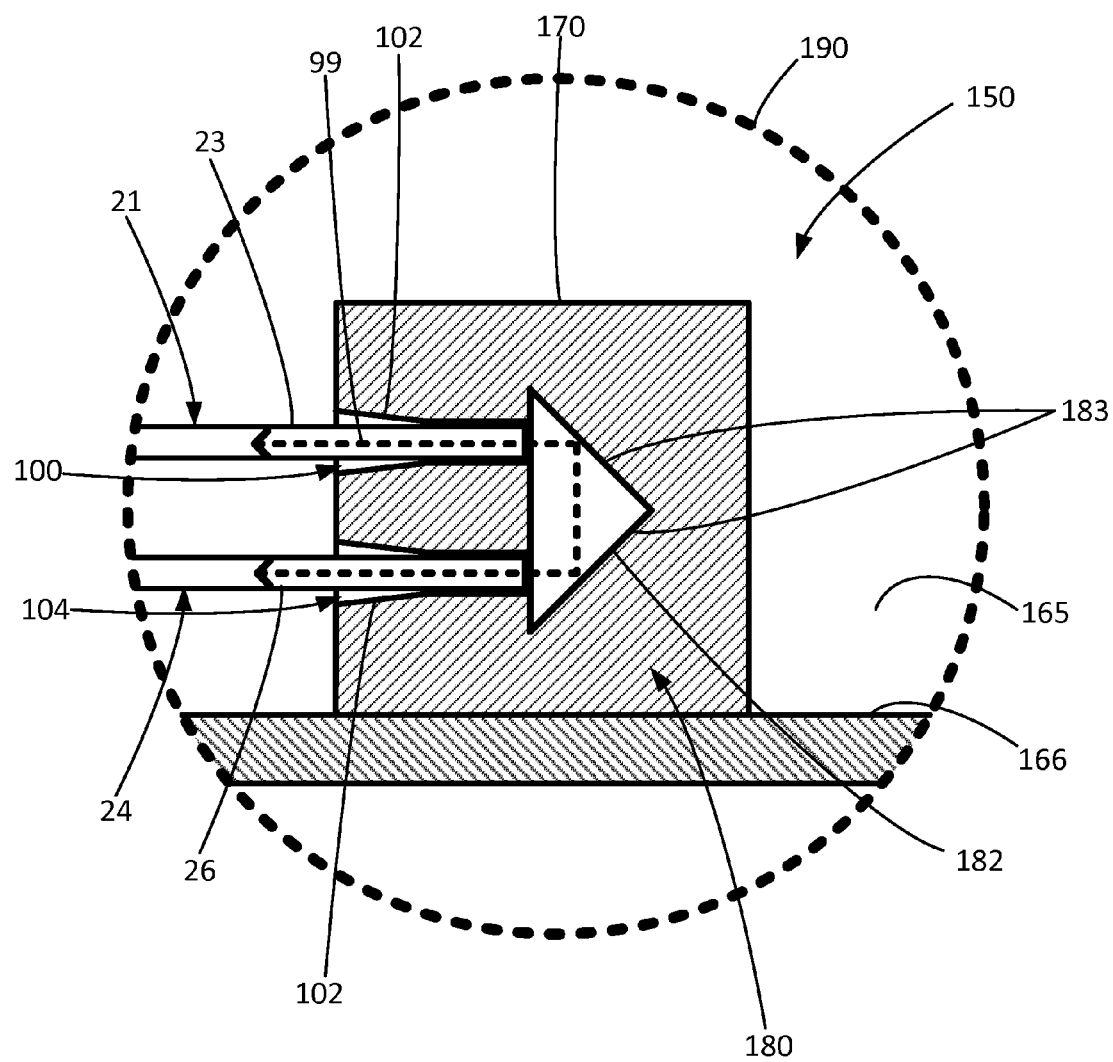
FIG. 9 is an enlarged, cross-sectional view of a portion of the system of FIG. 8.
Figure 10:
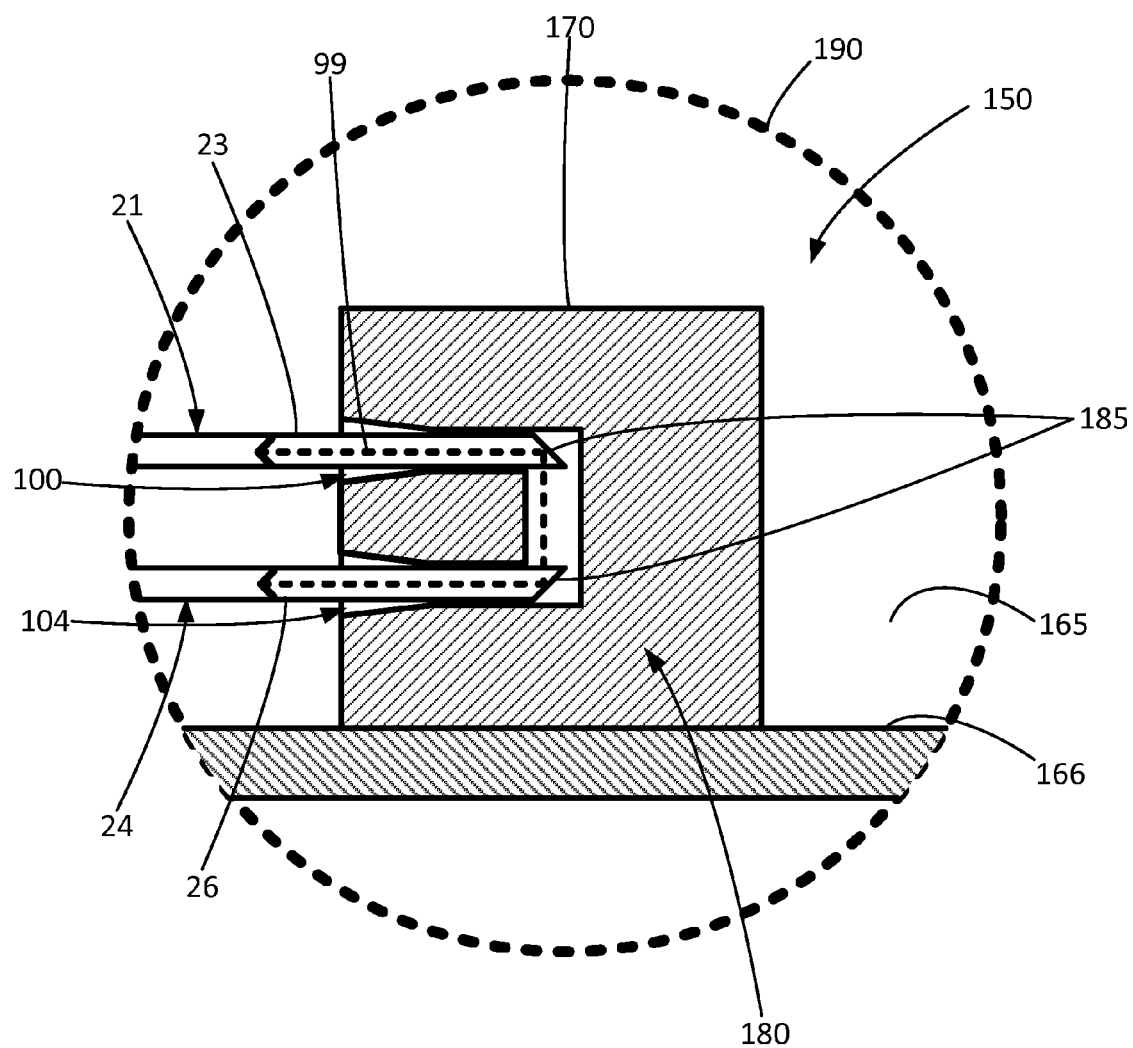
FIG. 10 is another enlarged, cross-sectional view of a portion of the system of FIG. 8.

Similar to the exemplary embodiment depicted in FIGS. 1-6, the exemplary embodiment depicted in FIGS. 7-8 may include a plurality of different optical coupling features 180 configured in a plurality of various ways. Two exemplary optical coupling features 180 used in the exemplary embodiment in FIGS. 7-8 are shown in FIGS. 9-10. More specifically, a cross-section of the area 190 of FIG. 8 taken parallel to the plane of the drawing (i.e., the plane of the sheet of paper the drawing of FIG. 8 is depicted thereon) is shown in each of FIGS. 9-10 to show one or more exemplary optical coupling features 180 inside the optical junction 170.

As shown in FIG. 9, the optical coupling features 180 may include an optical deflector 182. The optical deflector 182 may be located in the optical junction 170 so as to receive and transmit light from the second end portion 23 of the first optical cable 21 and to receive and transmit light from the second end portion 26 of the second optical cable 24. The optical deflector 182 may be configured to reflect, or redirect, light from and to the second end portion 23 of the first optical cable 21 180 degrees to and from the second end portion 26 of the second optical cable 24 as shown by the double-sided arrow 99. In other words the optical deflector 182 may define of 180 degree light turning structure. The optical deflector 182 may include one or more materials configured to at least transmit light. The one or more materials of the optical deflector 182 may include, e.g., glasses, polymers, metals, resin, air, vacuum, and/or silica.

The deflector 182 may include, or define, reflective surfaces 183 (e.g., metallized surfaces). One of the reflective surfaces 183 (e.g., a first metallized surface) may be positioned at a 45 degree angle to an axis extending along the second end portion 23 of the first optical cable 21, and another of the reflective surfaces 183 (e.g., a second metalized surface) may be positioned at a 45 degree angle to an axis extending along the second end portion 26 of the second optical cable 24. In other embodiments, the deflector 182 may include any type of light-turning structures or materials to turn (e.g., bend, direct, reflect, deflect, redirect, etc.) the light from and to the second portion 23 of the first optical cable 21 and the second portion 26 of the second optical cable 24.

In at least one embodiment, the optical deflector 182 may be void within the junction 170. For example, light exiting the second end portions 23, 26 of the first and second optical cables 21, 24 may travel through the void before impinging on the reflective surfaces 183. The reflective surfaces 183 may then reflect the light again through void to each other, and then reflect the light towards the corresponding second end portions 23, 26 of the first and second optical cables 21, 24.

Although the exemplary optical coupling features 180 as shown in FIG. 9 are configured to turn light (e.g., reflect, deflect, redirect, bend, etc. light) about 180 degrees, it is to be understood that other exemplary optical coupling features not depicted may be configured to turn light at different angles to accomplish the same optical coupling between the first and second optical cables 21, 24. For example, the first and second optical cables 21, 24 may not be parallel to each other when physically coupled to the junction 170, and the one or more optical coupling features 180 may be configured to facilitate such not parallel optical cables 21, 24 using various angles of redirection.

In FIG. 10, the optical coupling features 180 include cleaved surfaces 185 of the second portions 23, 26 of the first and second optical cables 21, 24. In this embodiment, light transmitted to and from the first and second optical cables 21, 23 may be reflected from the cleaved surfaces 185 to each other as shown by the double-sided arrow 99 through a totally internally reflective (TIR) effect. Further in at least one embodiment, the cleaved surfaces 185 may also be metallized to direct light to and from the second end portions 23, 26 of the first and second optical cables 21, 24, respectively.

Similar to the optical junctions 70 of FIGS. 5-6, the optical junction 170 may also define a first aperture 100 and a second aperture 104. The first aperture 100 may be configured to receive at least a portion of the second portion 23 of the first optical cable 21 and to physically couple the second portion 23 of the first optical cable 21 to the optical junction 170. The second aperture 104 may be configured to receive at least a portion of the second portion 26 of the second optical cable 24 and to physically couple the second portion 26 of the second optical cable 24 to the optical junction 170. Further, as shown, each of the first and second apertures 100, 104 may define tapered regions 102 configured to, e.g., provide ease of alignment of each of the first and second optical cables 21, 23 to be inserted therein and/or to provide a limited amount of movement.

As described herein, the exemplary systems, apparatus, devices, and structures may be used with various electronic devices such as, e.g., removable storage devices. A storage device 200 using the exemplary optical connector systems is depicted in FIGS. 11-12. As shown, the storage device 200 may include optical transceiver apparatus 210 that is operably coupled to the storage device 200 to, e.g., transmit and receive data via electrical and optical signals. More specifically, the optical transceiver apparatus 210 may receive electrical data signals, convert the electrical data signals into optical data signals, and transmit the optical data signals (e.g., electrical-to-optical data signal conversion), and may receive optical data signals, convert the optical data signals into electrical data signals, and transmit the electrical data signals (e.g., optical-to-electrical data signal conversion). The transceiver apparatus 210 may be fixedly coupled to at least a portion of the storage device 200 such as, e.g., a printed circuit board, etc. The exemplary storage device 200 may further include an optical connector 220 that is optically coupled to the transceiver apparatus 210 using the exemplary optical connector systems described herein.

The exemplary optical connector systems 250, 251 depicted in FIGS. 11-12 may include including a first optical cable 21, a second optical cable 24, and a spool 255 upon which at least a portion of each of the first and a second optical cables 21, 24 may be wrapped thereabout. The first optical cable 21 may be physically and optically coupled to the transceiver apparatus 210 and the second optical cable 24 may be physically and optically coupled to the optical connector 220.

Figure 11B:
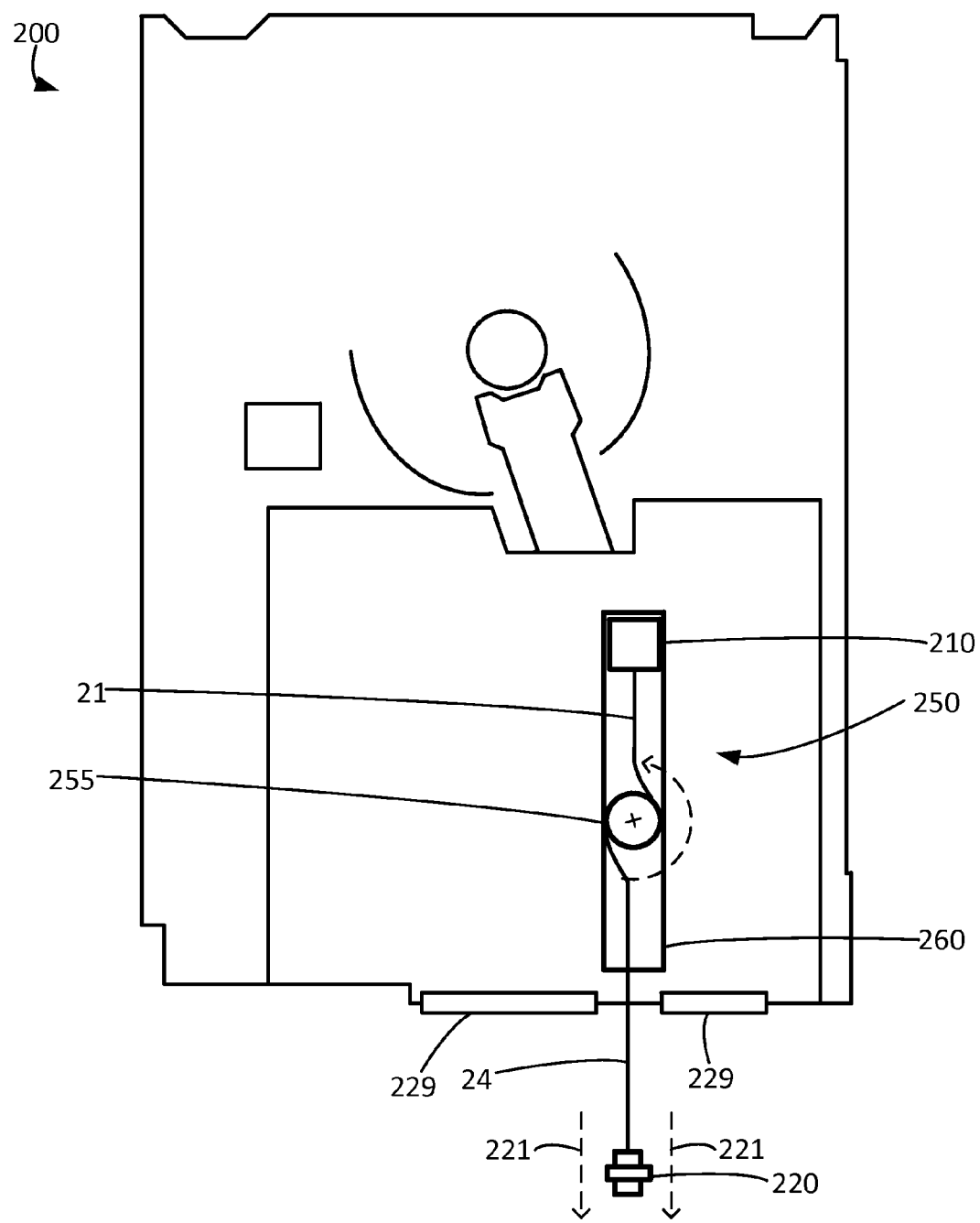
Figure 11D:
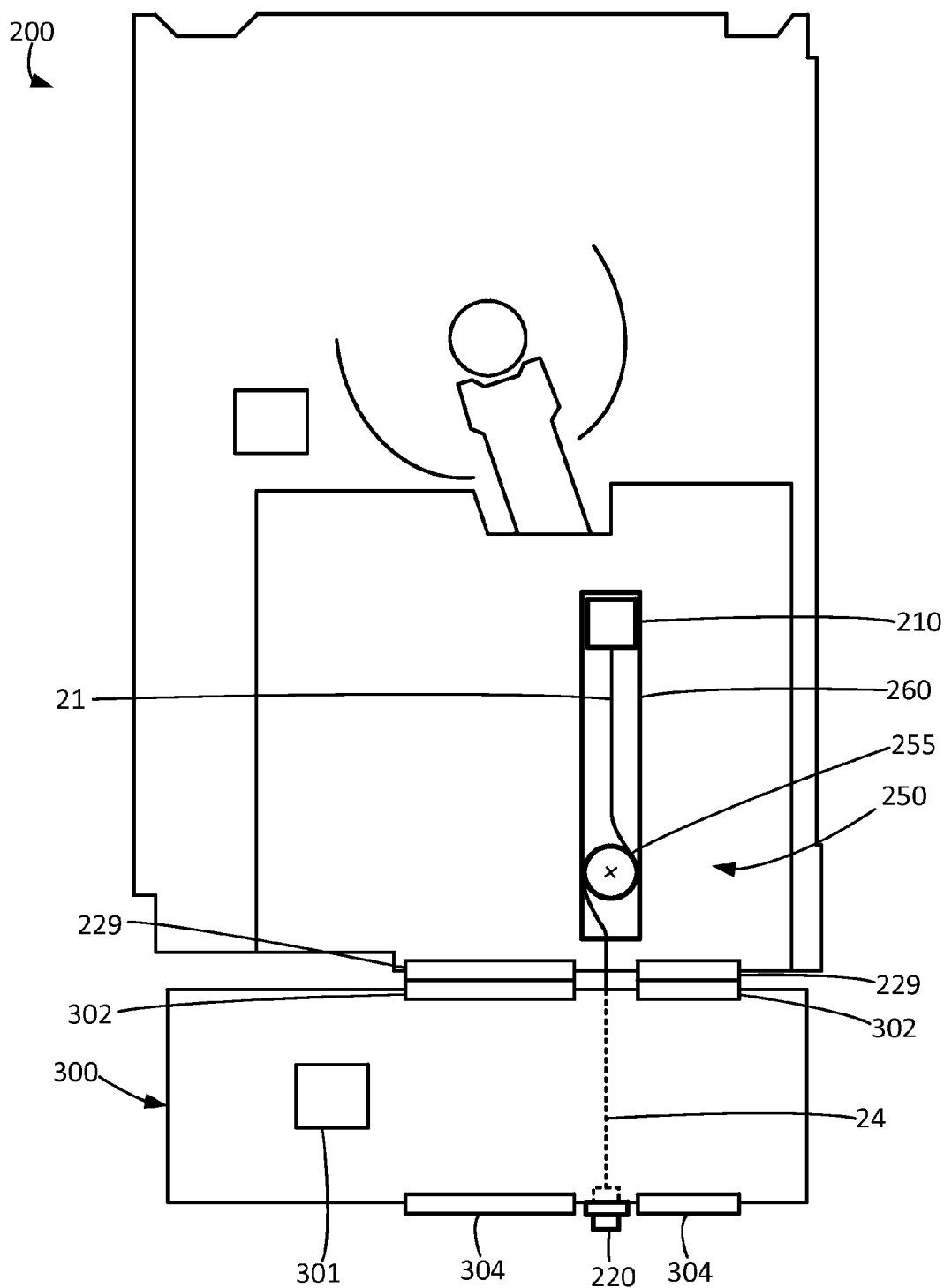
Figure 12A:
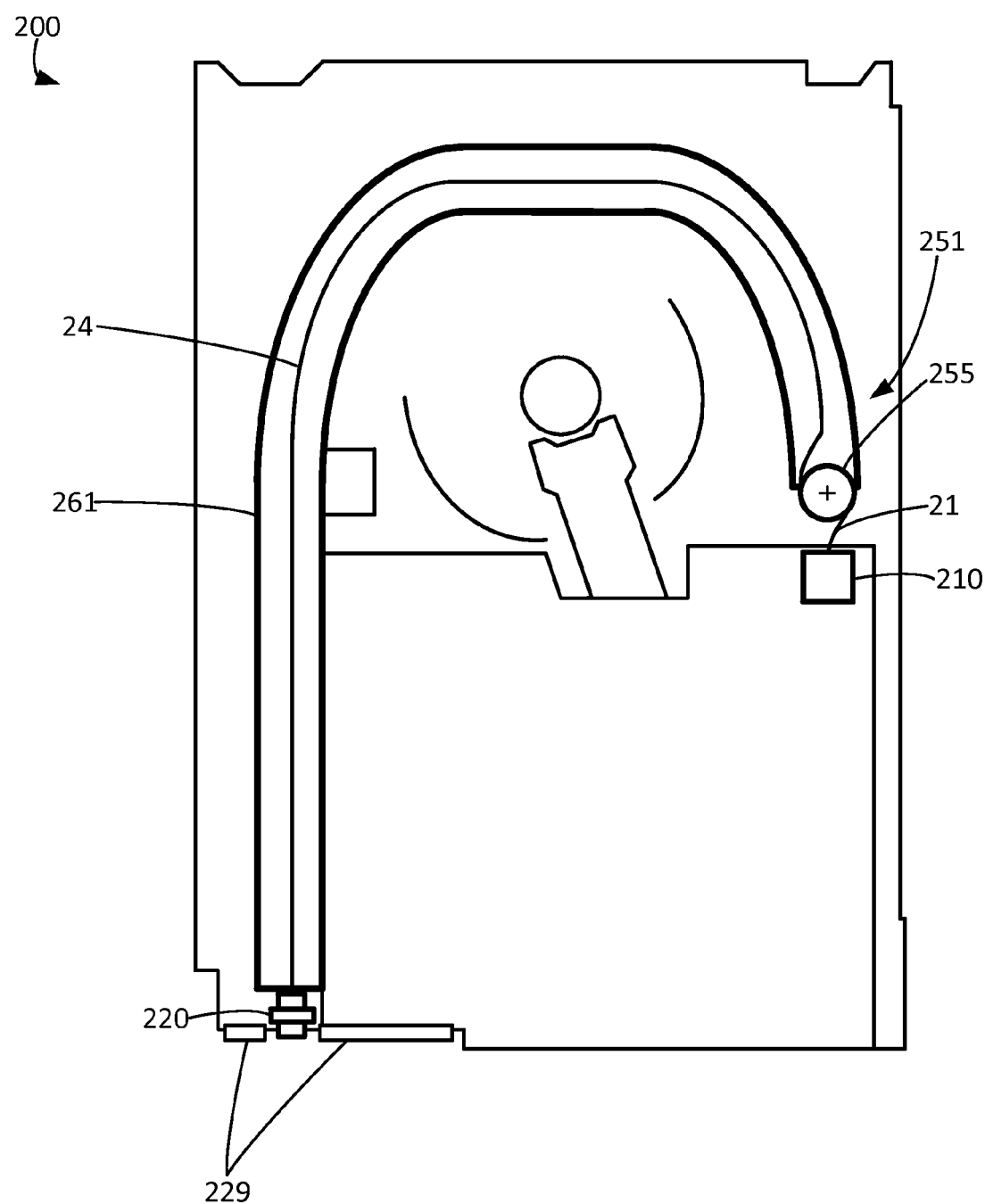
FIGS. 12A-12D are bottom views of another exemplary storage device and optical coupling system.
Figure 12B:
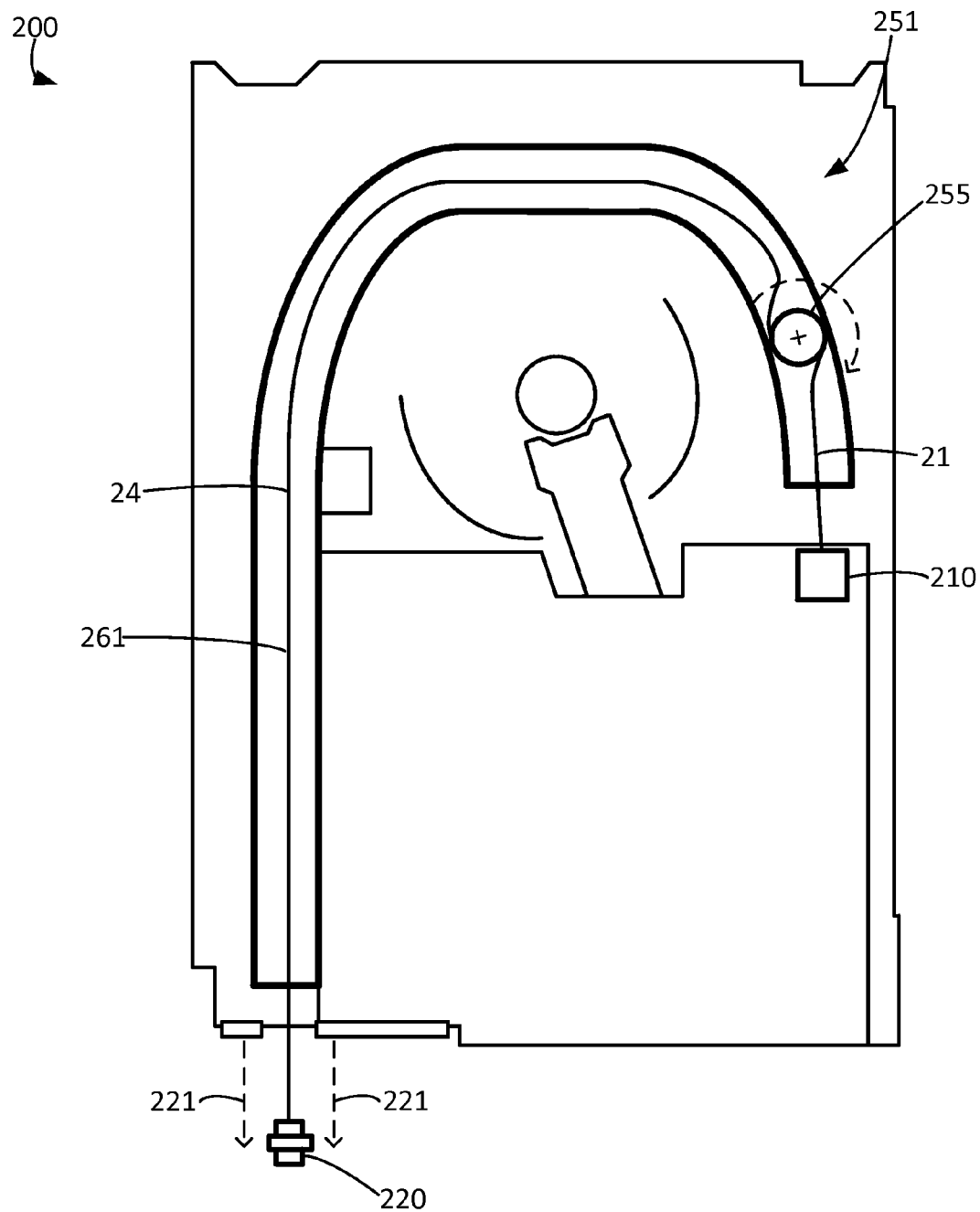

As shown in FIGS. 11B & 12B, the optical connector 220 may be extended from the remainder of the storage device 200 to, e.g., connect, or couple, the optical connector 220 to another device such as, e.g., a drive dongle, network interface card (NIC), etc., which will be described herein with respect to FIGS. 11D & 12D. As the optical connector 220 is extended from the remainder the storage device 200, the optical connector systems 250, 251 may facilitate the extension of the optical connector 220 away from the remainder the storage device 200 without optically or physically decoupling, or uncoupling, the optical connector 220 from the transceiver apparatus 210.

Figure 11C:
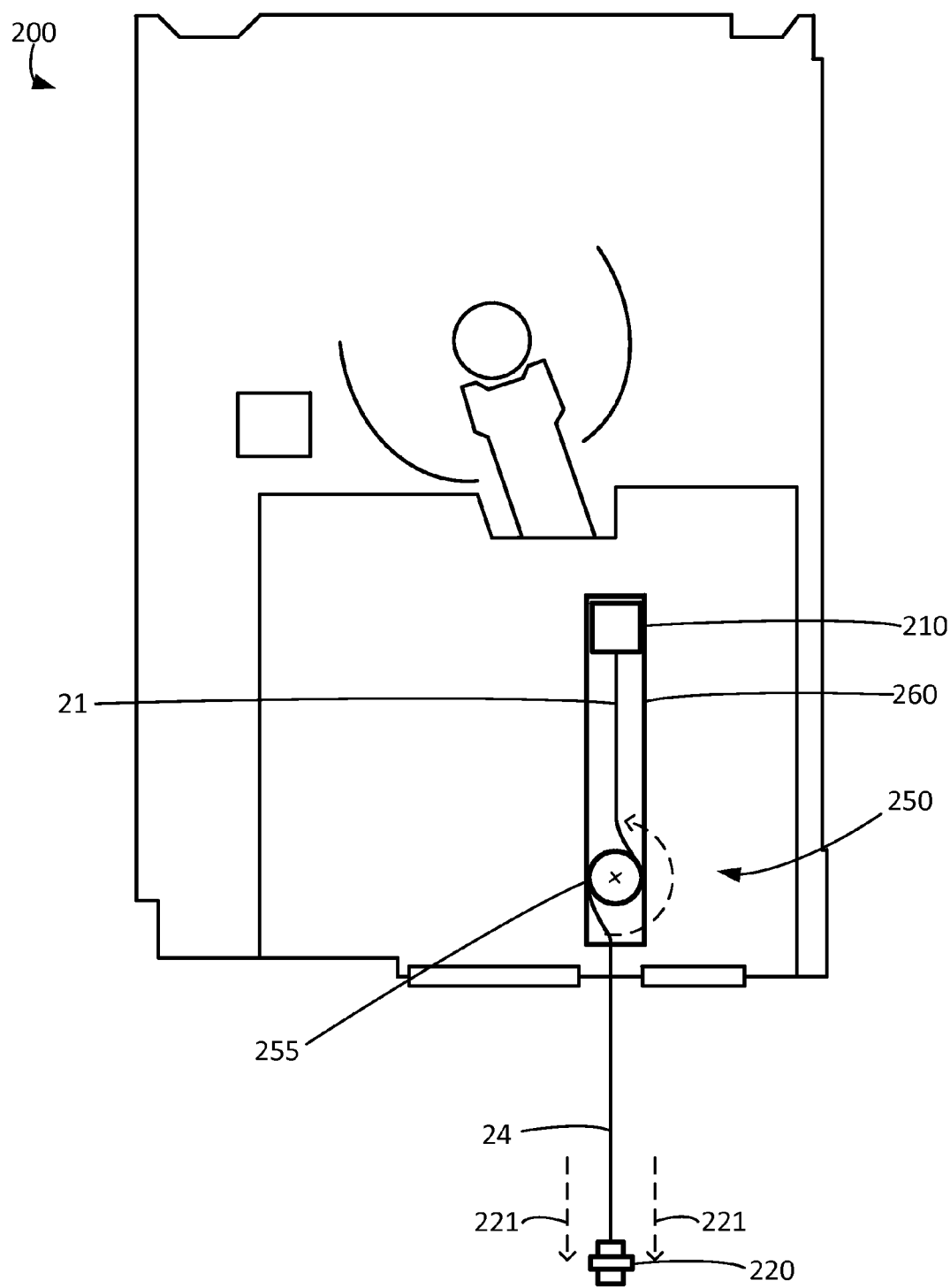
Figure 12C:
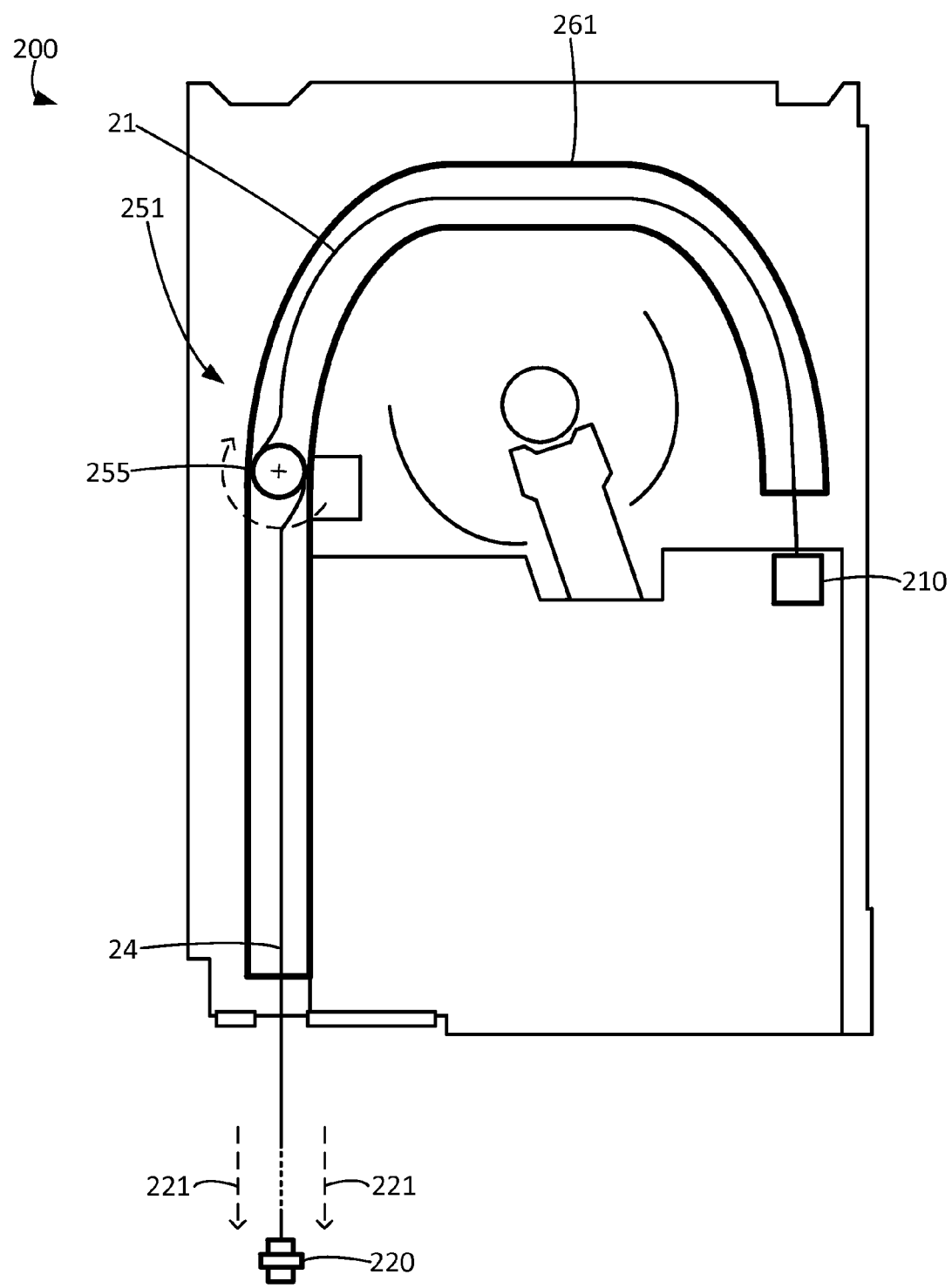

As the optical connector 220 is extended away from the remainder of the storage device 200 as indicated by arrows to 221, the spool 255 may rotate counterclockwise as shown in system 250 of FIGS. 11B-11C or clockwise as shown in system 251 of FIGS. 12B-12C to unroll, or unfurl, at least a portion of each of the first and second optical cables 21, 24. Additionally, at least in the exemplary system 250 depicted in FIGS. 11A-11C, when the spool 255 rotates counterclockwise to unroll at least a portion of each of the first and second optical cables 21, 24, the spool 255 may also move in the same direction arrows 221 (e.g., towards a perimeter of the storage device 200).

As shown, the optical connector systems 250, 251 may further include, or define, channels 260, 261, respectively, along with and/or within which the spool 255 may travel when the optical connector 220 is being moved away from the storage device 200. In other words, the channels 260, 261 may guide the spool 255 when the spool 255 moving therein. The channel 260 of the system 250 of FIGS. 11A-C is straight and may allow the optical connector 220 to be extended away from the storage device 200 about 30 percent to about 40 percent of the length of the storage device 200. The channel 261 of the system 251 of FIGS. 12A-12C is a longer than the channel 260 of the system 250 of FIGS. 11A-11C and defines a curve that may, e.g., allow the optical connector 220 be extended away from the storage device 200 about 100 percent to about 150 percent of the length of the storage device 200.

As described herein with reference to FIGS. 1-10, the spool 255 may be biased to rotate in a particular direction to rewind the first and second optical cables 21, 24. In other words, the first and second optical cables 21, 24 may be retractable by the spool 255. More specifically, the spool 255 may be biased to rotate clockwise in the system 250 of FIGS. 11B-11C or counter clockwise in the system 251 of FIGS. 12B-12C to rewind at least a portion of each of the first and second optical cables 21, 24. Thus, after the optical connector 220 has been coupled to another device, a storage device 200 may be moved proximate the optical connector 220, the optical connector system 250 may rewind, or retract, at least portions of each of the first and second optical cables 21, 24.

The storage devices 200 depicted in FIGS. 11-12 may further include electrical interfaces 229 configured to be coupled to another device, e.g., for transmission of electrical data signals to and from the storage devices 200, for power transmission to the storage devices 200, for operably coupling another device (e.g., computing device, networking device, etc.) to the storage devices 200, etc. The optical connector 220, as shown, may be located proximate the electrical interfaces 229. More specifically, as shown, the optical connector 220 is located between two electrical interfaces 229. In other embodiments, the optical connector 220 may be located anywhere relative to the electrical interfaces 229.

The electrical interfaces 229 may be couplable to another device that serves as an extension to the storage devices 200. For example, a dongle, networking interface card (NIC), a computing device, etc. may be attached to the storage devices 200 and operably coupled using the electrical interfaces 229. As shown in FIG. 11D, an additional device 300 is coupled to the storage device 200, and as shown in FIG. 12D, an additional device 400 is coupled to the storage device 200. The additional devices 300, 400 may include first electrical interfaces 302, 402, respectively, operably coupled to the electrical interfaces 229 of the storage device 229. Further, the additional devices 300, 400 may include various functional apparatus 301, 401 (e.g., computing apparatus, etc.), respectively, and second electrical interfaces 304, 404, respectively. In at least one embodiment, the second electrical interfaces 304, 404 may be operably coupled to the electrical interfaces 229 and first electrical interfaces 302, 402 such that operably coupling the second electrical interfaces 304, 404 to another device will also operably couple the electrical interfaces 229 and the first electrical interfaces 302, 402 to such another device.

The system 250 may be configured to work in conjunction with the additional devices 300, 400. For example, as shown, the optical connector 220 may be extended through or by at least a portion of the additional devices 300, 400 to allow the optical connector 220 to be coupled to the device that the additional devices 300, 400 are configured to be coupled to or to another device. Thus, the storage device 200 can bypass any optical connections to the additional device 300, 400 using the exemplary system 250. For example, a separate optical cable, which in turn, may use additional optical connections or couplings, may not be necessary when using the exemplary system 250.

In at least one embodiment, the extendable optical connector 220 of the exemplary system 250 may be connected to a compliant receptacle, e.g., a similar drive connector with a slot to capture the optical connector 220, that resides on an additional device 300, 400 attached to the storage device 200 (e.g., drive, drive carrier, etc.) serving as an extension to the storage device 200. For example, the additional device 300, 400 may be a dongle or NIC (Network Interface Card) for microservers.

Figure 12D:
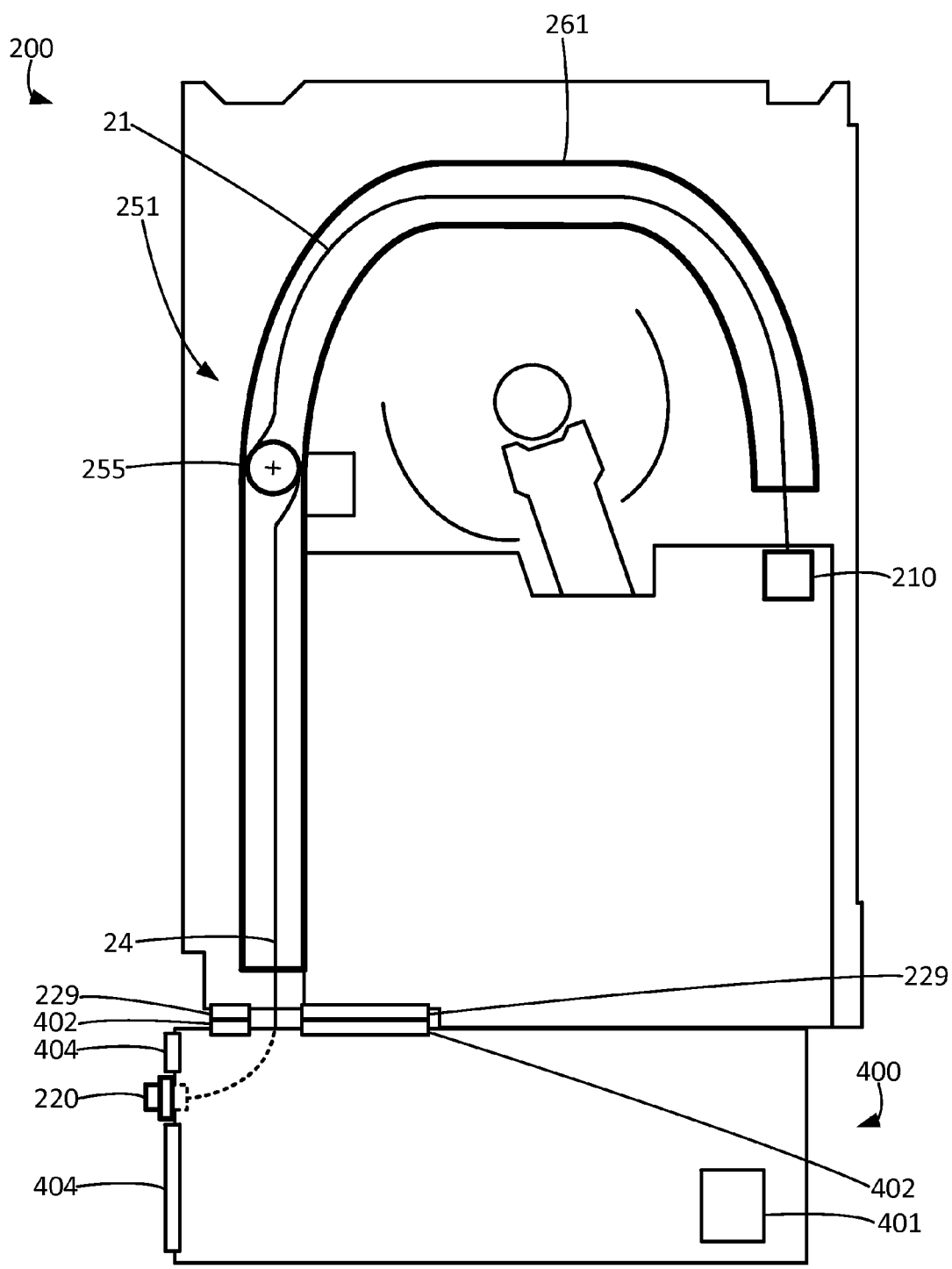

Further, the additional device 400 depicted in FIG. 12D may be a dongle configured to allow, or enable, the storage device 200 to be inserted effectively sideways into a device enclosure, which may improve density.

Still further, in other words, the optical coupling system 11 depicted in FIGS. 7-10 may be described as a 180 degree mirrored retractable nested reel or spool. In at least one embodiment, the system includes a single 180 degree optical coupling portion such that light from the output fibre is immediately redirected into an input fibre which extends in the opposite direction to the output fibre. This exemplary cable arrangement may be described as providing the ability that the optical cables can be retracted and extended in both directions to and away from the reel, while minimizing the number of optical coupling portions (e.g., mirroring fixtures).

In the preceding description, reference is made to the accompanying set of drawings that form a part hereof and in which are shown by way of illustration several specific embodiments. It is to be understood that other embodiments are contemplated and may be made without departing from (e.g., still falling within) the scope or spirit of the present disclosure. The preceding detailed description, therefore, is not to be taken in a limiting sense. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

It is noted that terms such as "top", "bottom", "above, "below", etc. may be used in this disclosure. These terms should not be construed as limiting the position or orientation of a structure, but should be used as providing spatial relationship between the structures.

Embodiments of the systems, apparatus, and methods are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present invention is limited only by the claims that follow.

What is claimed:

1. An apparatus comprising:
   a single spool rotatable about an axis and defining a circumferential surface to store at least a portion of each of a first optical cable and a second optical cable about the axis; and
   one or more optical coupling features coupled to the spool and optically coupling the first optical cable to the second optical cable, wherein the one or more optical coupling features comprise a 180 degree optical deflector proximate the circumferential surface to redirect light 180 degrees from the first optical cable to the second optical cable and from the second optical cable to the first optical cable.

2. The apparatus of claim 1, wherein the single spool defines a radius extending from the axis to the circumferential surface that is less than 200% the minimum radius of curvature of the first and second optical cables, wherein the single spool defines a height extending along the axis between a first side of the single spool and a second side of the single spool opposite the first side and the height is less than or equal to 6 millimeters.

3. The apparatus of claim 1, wherein the single spool defines a radius extending from the axis to the circumferential surface that is equal to the minimum radius of curvature of the first and second optical cables.

4. The apparatus of claim 1, further comprising an optical junction coupled to the spool, wherein the optical junction defines at aperture receiving at least a portion of the first optical cable to optically couple the first optical cable to the one or more optical coupling features.

5. The apparatus of claim 4, wherein at least a portion of the aperture is tapered to align the first optical cable.

6. A system comprising:
   a first optical cable extending from a first end portion to a second end portion;
   a second optical cable extending from a first end portion to a second end portion;
   a optical cable coupling device rotatable about an axis and defining a circumferential surface to store at least a portion of each of the first and second optical cables about the axis;
   a biasing apparatus to bias the optical cable coupling device for rotation about the axis in a clockwise direction to wind at least a portion of each of the first and second optical cables on the circumferential surface;
   at least one optical coupling feature coupled to the optical cable coupling device and optically coupling the second end portion of the first optical cable to the second end portion of the second optical cable; and
   a removable device comprising at least one of a data storage device, a networking device, and a computing device, wherein the optical cable coupling device is movably coupled to the removable device, wherein the first end portion of the first optical cable is operably coupled to removable device, and wherein the first end portion of the second optical cable is operably coupled to an optical connector to optically couple the removable device to another device.

7. The system of claim 6, wherein the first optical cable is totally internally reflective and the at least one optical coupling feature comprises a cleaved surface of the first optical cable to direct light from the first optical cable to the second optical cable and to receive light from the second optical cable.

8. The system of claim 6, wherein the at least one optical coupling feature comprises a cleaved, metallized surface of the first optical cable to direct light from the first optical cable to the second optical cable and to direct light from the second optical cable into the first optical cable.

9. The system of claim 6, wherein the at least one optical feature comprises comprise a waveguide coupled to the spool and optically coupling the first optical cable to the second optical cable.

10. The system of claim 6, wherein the removable device defines a high density, small form factor and comprises at least one interface of a SATA interface, a PCIe interface, and a SAS interface such that the at least one interface and the optical connector integrates within the high density, small form factor of the removable device.

11. The system of claim 6, wherein the optical cable coupling device defines a radius extending from the axis to the circumferential surface that is less than 200% the minimum radius of curvature of the first and second optical cables, and wherein the optical cable coupling device defines a height extending along the axis between a first side of the optical cable coupling device and a second side of the optical cable coupling device and the height is less than or equal to 6 millimeters of the minimum radius of curvature of the first and second optical cables.

12. The system of claim 6, wherein the at least one optical coupling feature comprises:
a first optical deflector coupled to the optical cable coupling device proximate the circumferential surface; and
a second optical deflector coupled to the optical cable coupling device proximate the circumferential surface,
wherein the first optical deflector directs light from the first optical cable to the second optical deflector and directs light from the second optical deflector to the first optical cable,
wherein the second optical deflector directs light from the second optical cable to the first optical deflector and directs light from the first optical deflector to the second optical cable.

13. The system of claim 12, wherein the first optical deflector defines an angle of redirection of 90 degrees to redirect light 90 degrees and the second optical deflector defines an angle of redirection of 90 degrees to redirect light 90 degrees.

14. The system of claim 12, wherein the first optical deflector comprises a reflective surface to reflect light from the first optical cable to the second optical deflector and to reflect light from the second optical deflector to the first optical cable.

15. The system of claim 6, wherein the at least one optical coupling feature comprises an optical channel coupled to the optical cable coupling device and optically coupling the first optical cable to the second optical cable.

* * * * *

UNITED STATES PATENT AND TRADEMARK OFFICE
CERTIFICATE OF CORRECTION

PATENT NO. : 9,690,067 B2
APPLICATION NO. : 14/823118
DATED : June 27, 2017
INVENTOR(S) : Richard C. A. Pitwon It is certified that error appears in the above-identified patent and that said Letters Patent is hereby corrected as shown below:

On the Title Page

Item [57], Line 10: replace "a radius that less than" with --a radius that is less than--

In the Claims

Claim 4:
Column 16, Line 37: replace "defines at aperture" with --defines an aperture--

Claim 9:
Column 17, Line 13: delete the word "comprise"

Signed and Sealed this
Twenty-seventh Day of March, 2018

Andrei Iancu
*Director of the United States Patent and Trademark Office*